United States Patent
Dellock et al.

(10) Patent No.: US 9,896,020 B2
(45) Date of Patent: Feb. 20, 2018

(54) VEHICLE LIGHTING ASSEMBLY

(71) Applicant: Ford Global Technologies, LLC, Dearborn, MI (US)

(72) Inventors: Paul Kenneth Dellock, Northville, MI (US); Marla Johnston, Plymouth, MI (US); Stuart C. Salter, White Lake, MI (US); Christopher Anthony Danowski, Rochester, MI (US); Jason C. Rogers, Shelby Township, MI (US); Pietro Buttolo, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 128 days.

(21) Appl. No.: 15/161,635

(22) Filed: May 23, 2016

(65) Prior Publication Data
US 2017/0334336 A1    Nov. 23, 2017

(51) Int. Cl.
*B60Q 1/00* (2006.01)
*B60Q 3/00* (2017.01)
(Continued)

(52) U.S. Cl.
CPC ............ *B60Q 1/0023* (2013.01); *B60Q 1/24* (2013.01); *B60Q 1/30* (2013.01); *B60Q 1/38* (2013.01); *B60Q 1/46* (2013.01); *B60R 1/00* (2013.01); *F21S 48/215* (2013.01); *F21S 48/238* (2013.01); *F21V 9/16* (2013.01);
(Continued)

(58) Field of Classification Search
CPC ....... B60C 1/0017; B60C 1/0023; B60C 1/24; B60C 1/26; B60C 1/2607; B60C 1/2619; B60C 1/2696; B60C 1/30; B60C 1/38; B60C 1/46; B60R 1/00; B60R 23/00; B60R 23/105; B60R 23/303; B60R 23/304; F21S 48/215; F21S 48/238; F21V 9/16; F21V 23/02; G06K 9/00791; H05B 33/0854; H05B 33/0872; H05B 37/0218; H05B 37/0227
USPC ........ 362/478, 487, 496–499, 505, 509–510, 362/540–545
See application file for complete search history.

(56) References Cited

U.S. PATENT DOCUMENTS

| | | |
|---|---|---|
| 2,486,859 A | 11/1949 | Meijer et al. |
| 4,556,862 A | 12/1985 | Meinershagen |
| (Continued) | | |

FOREIGN PATENT DOCUMENTS

| | | |
|---|---|---|
| CA | 2061286 A1 | 2/1992 |
| CA | 2178793 A1 | 6/1996 |
| (Continued) | | |

OTHER PUBLICATIONS

Hirano, Steve, "Extending Safety Margins Around School Buses," web page, Aug. 2004, 3 pages, http://www.schoolbusfleet.com/channel/schoolbussafety/articles/print/story/2004/08/extendingsafetymarginsaroundschoolbuses.aspx.

Primary Examiner — Jason Moon Han
(74) Attorney, Agent, or Firm — Jason Rogers; Price Heneveld LLP

(57) ABSTRACT

A lighting assembly for a vehicle is provided herein. The lighting assembly includes first and second sets of light sources disposed on a bumper of the vehicle. A photoluminescent structure is disposed on the lighting assembly and configured to luminesce in response to excitation by the first or second sets of light sources. A detection system is configured to detect an object disposed proximately to the vehicle. The first or second set of light sources illuminate upon the detection of the object.

19 Claims, 19 Drawing Sheets

(51) Int. Cl.

| | | |
|---|---|---|
| *B60Q 11/00* | (2006.01) | |
| *F21V 9/16* | (2006.01) | |
| *F21S 8/10* | (2006.01) | |
| *B60Q 1/24* | (2006.01) | |
| *B60Q 1/38* | (2006.01) | |
| *B60Q 1/30* | (2006.01) | |
| *B60Q 1/46* | (2006.01) | |
| *F21V 23/02* | (2006.01) | |
| *H05B 33/08* | (2006.01) | |
| *H05B 37/02* | (2006.01) | |
| *B60R 1/00* | (2006.01) | |
| *G06K 9/00* | (2006.01) | |
| *F21Y 101/02* | (2006.01) | |

(52) U.S. Cl.
CPC .......... *F21V 23/02* (2013.01); *G06K 9/00791* (2013.01); *H05B 33/0854* (2013.01); *H05B 33/0872* (2013.01); *H05B 37/0218* (2013.01); *H05B 37/0227* (2013.01); *B60R 2300/105* (2013.01); *B60R 2300/303* (2013.01); *F21Y 2101/02* (2013.01)

(56) References Cited

U.S. PATENT DOCUMENTS

| | | |
|---|---|---|
| 4,868,719 A | 9/1989 | Kouchi et al. |
| 4,954,808 A | 9/1990 | Duerkob |
| 5,053,930 A | 10/1991 | Benavides |
| 5,467,071 A | 11/1995 | Koenig |
| 5,604,480 A | 2/1997 | Lamparter |
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Thompson et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,952,162 B2 | 10/2005 | Monck et al. |
| 6,953,536 B2 | 10/2005 | Yen et al. |
| 6,990,922 B2 | 1/2006 | Ichikawa et al. |
| 7,002,458 B2 | 2/2006 | Su |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,004,394 B2 | 8/2011 | Englander |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,120,236 B2 | 2/2012 | Auday et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,933,817 B2 | 1/2015 | Caudill |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,020,730 B2 | 4/2015 | Agnew |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2001/0014025 A1 | 8/2001 | Hymer |
| 2002/0097146 A1 | 7/2002 | Harris, III |
| 2002/0159741 A1 | 10/2002 | Graves et al. |
| 2002/0163792 A1 | 11/2002 | Formosa |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0084790 A1 | 3/2015 | Arpin et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |

(56) References Cited

U.S. PATENT DOCUMENTS

2016/0102819 A1    4/2016   Misawa et al.
2016/0236613 A1    8/2016   Trier
2017/0158125 A1    6/2017   Schuett et al.

FOREIGN PATENT DOCUMENTS

| | | |
|---|---|---|
| CN | 101337492 A | 1/2009 |
| CN | 201169230 Y | 2/2009 |
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2263915 A1 | 12/2010 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

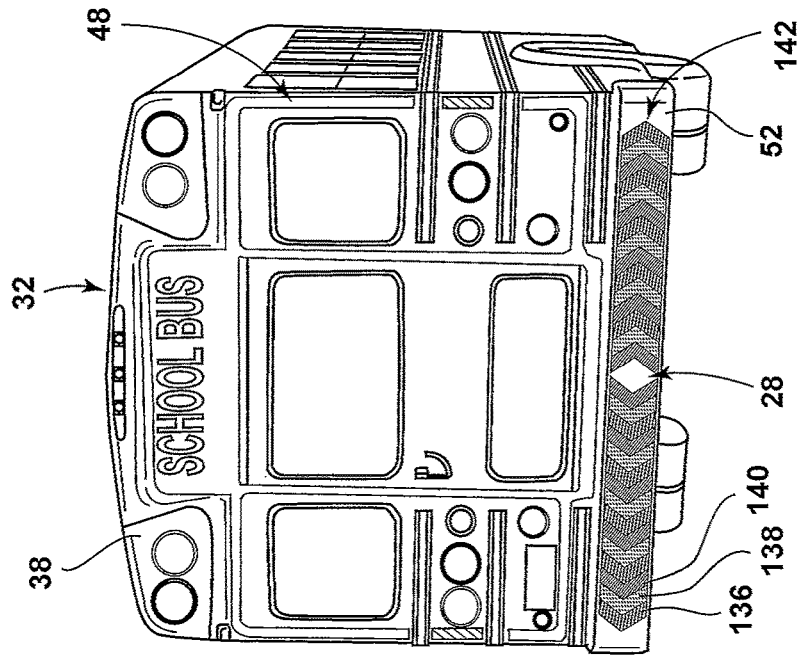
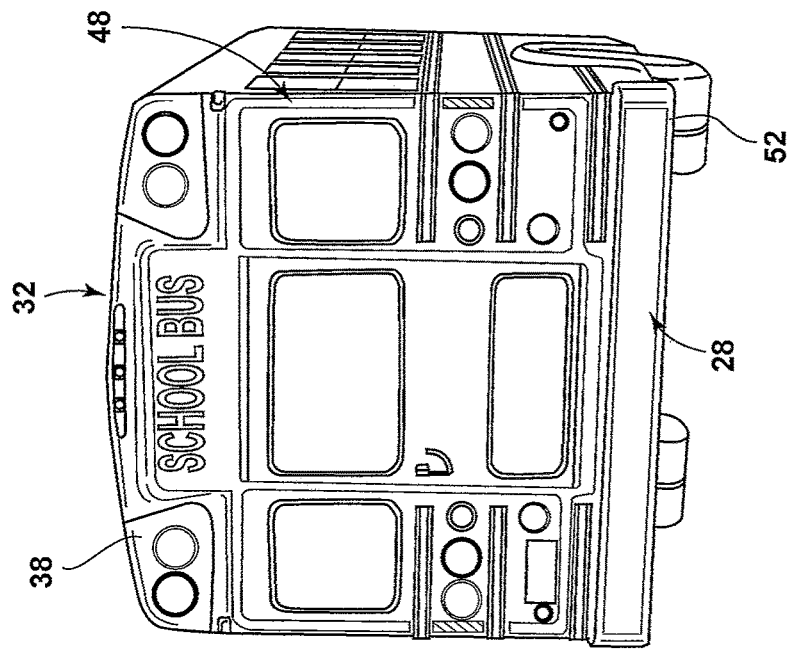
FIG. 4A
FIG. 4B

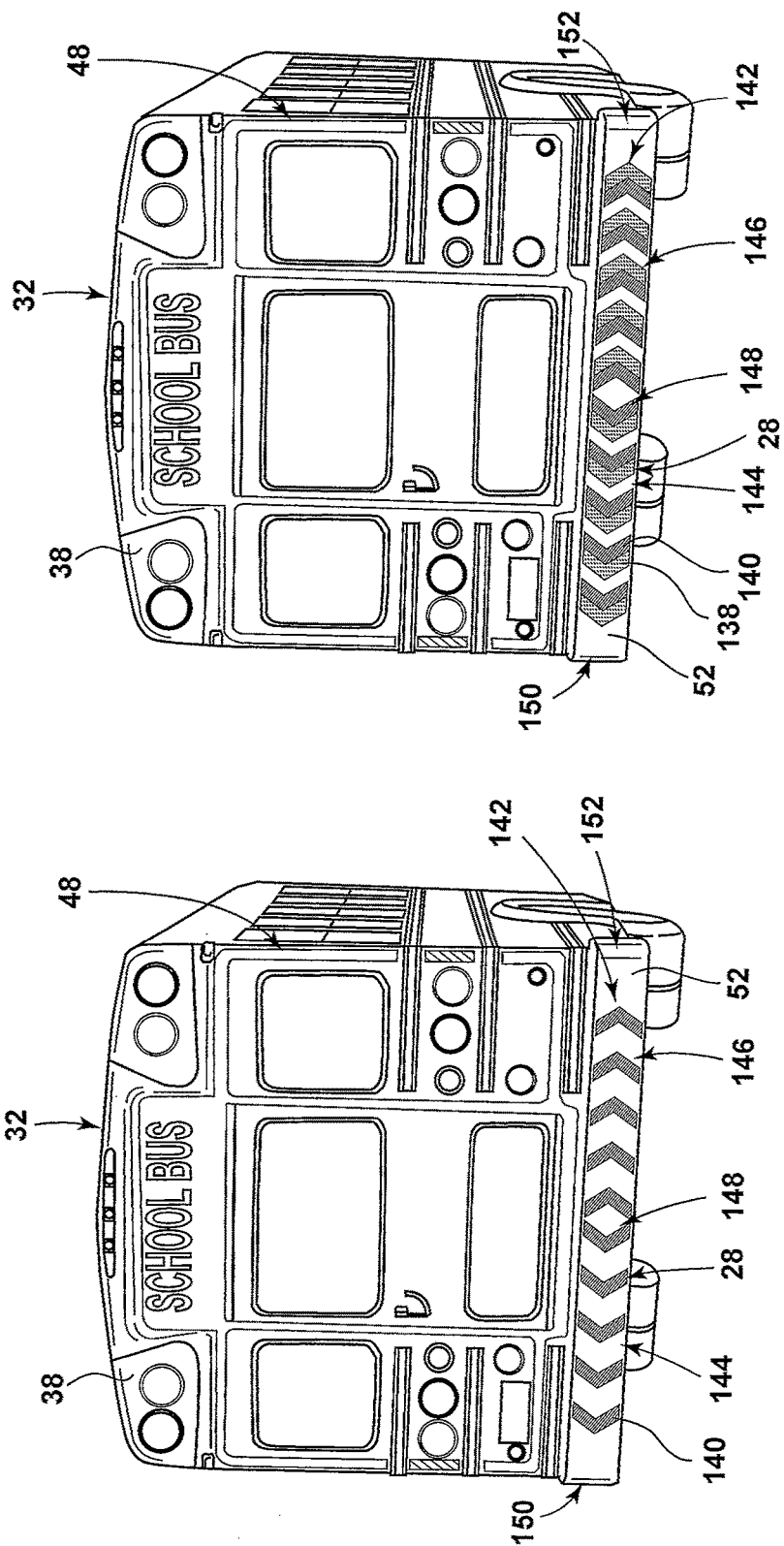

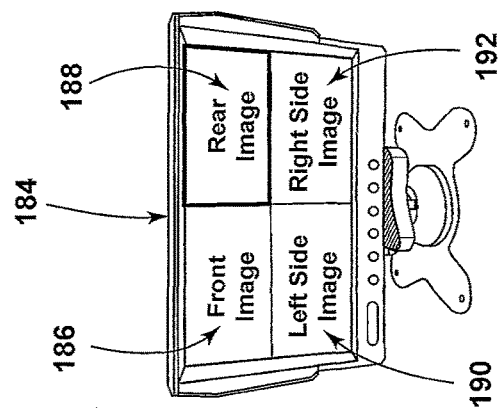
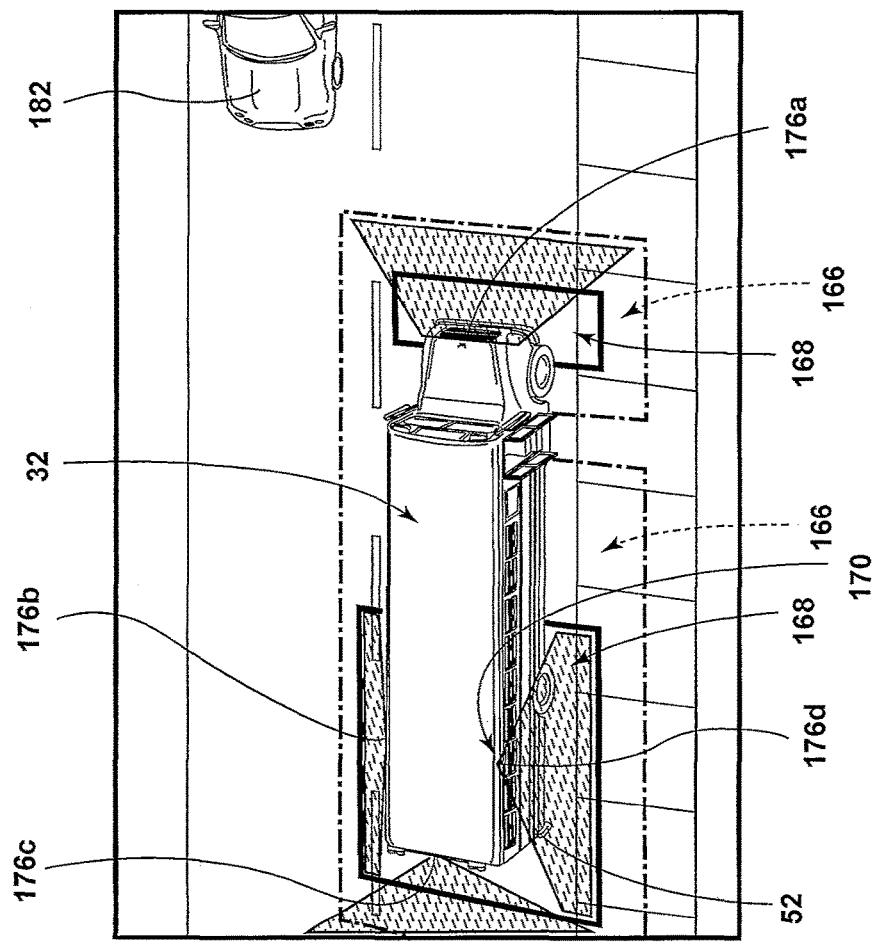
FIG. 13B
FIG. 13A

VEHICLE LIGHTING ASSEMBLY

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a vehicle is disclosed. The vehicle includes a lighting assembly having first and second sets of light sources disposed on a bumper of the vehicle. A photoluminescent structure is disposed on the lighting assembly and is configured to luminesce in response to excitation by the first or second sets of light sources. A detection system is configured to detect an object disposed proximately to the vehicle. The first or second set of light sources illuminates upon the detection of the object.

According to another aspect of the present invention, a lighting assembly for a vehicle panel is disclosed. The lighting assembly includes a light-producing assembly having a first, a second, and a third set of light sources therein. A photoluminescent structure is disposed on the light-producing assembly and is configured to luminesce in response to excitation by the first, the second, and the third set of light sources of the light-producing assembly. Each respective set of light sources independently illuminates based on a pre-defined event.

According to another aspect of the present invention, a lighting assembly for a vehicle is disclosed. The lighting assembly includes a light source and a detection system including one or more sensors. The one or more sensors is configured to detect an object proximately disposed to a vehicle. A controller is operably coupled with the light source and the detection system such that the light source is illuminated when the one or more sensors detects an object.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4A is a rear perspective view of the vehicle having the lighting assembly disposed on a rear bumper in an unilluminated state, according to one embodiment;

FIG. 4B is a rear perspective view of the vehicle having the lighting assembly disposed on the rear bumper including three sets of independently illuminable light sources, according to one embodiment;

FIG. 4E is a rear perspective view of the vehicle having the lighting assembly disposed on the rear bumper having one set of light sources illuminated, according to one embodiment;

FIG. 4F is a rear perspective view of the vehicle having the lighting assembly disposed on the rear bumper having multiple sets of light sources concurrently illuminated;

FIG. 13A is a top perspective view of the vehicle having the detection system, according to one embodiment, that includes one or more cameras disposed around the vehicle; and FIG. 13B is a perspective view of an interface that displays images received from the one or more cameras disposed around the vehicle.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lighting assembly that may be attached to a vehicle. The lighting assembly may include one or more photoluminescent structures configured to convert an excitation light received from an associated light source to a converted light at a different wavelength typically found in the visible spectrum. According to some embodiments, the lighting assembly may be used in conjunction with a vehicle sensor to monitor an area that surrounds the vehicle.

Figure 1A:
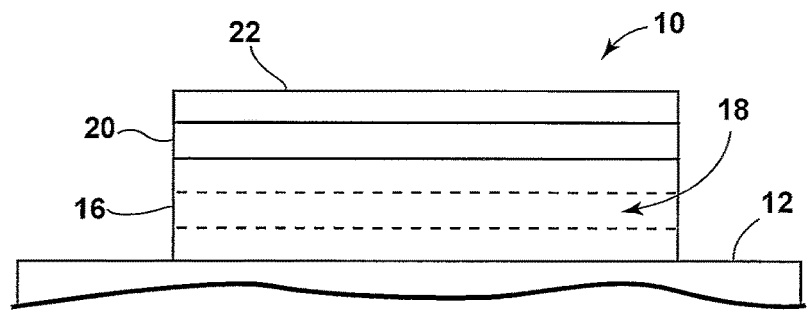
FIG. 1A is a side view of a photoluminescent structure rendered as a coating for use in a vehicle lighting assembly according to one embodiment.
Figure 1B:
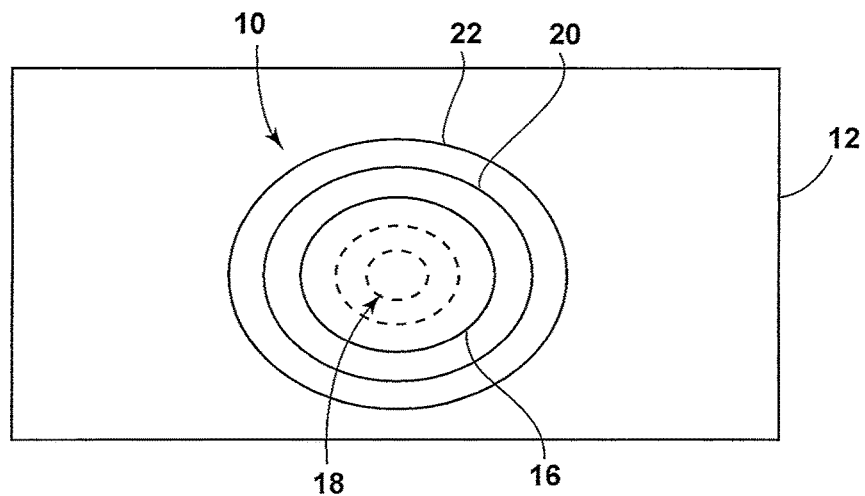
FIG. 1B is a top view of a photoluminescent structure rendered as a discrete particle according to one embodiment.
Figure 1C:
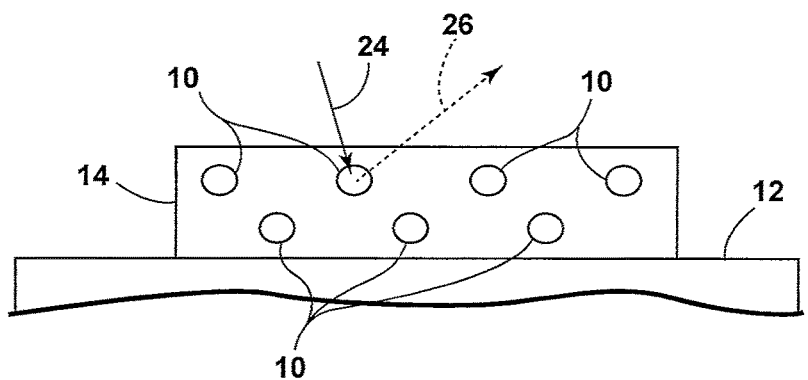
FIG. 1C is a side view of a plurality of photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26 that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by a light source 44 (FIG. 2) is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the photoluminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some embodiments, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principle driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION"; U.S. Pat. No. 8,664,624 B2 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Patent Publication No. 2014/0103258 A1 to Agrawal et al., entitled "CHROMIC LUMINESCENT COMPOSITIONS AND TEXTILES," all of which are incorporated herein by reference in their entirety.

According to one embodiment, the photoluminescent material 18 may include organic or inorganic fluorescent dyes including rylenes, xanthenes, porphyrins, phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from $5d^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation light 24 emitted from a light source 44. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistence photoluminescent material 18 that emits the converted light 26, once charged by the excitation light 24. The excitation light 24 may be emitted from any excitation source (e.g., any natural light source, such as the sun, and/or any artificial light source 44). The long persistence photoluminescent material 18 may be defined as having a long decay time due to its ability to store the excitation light 24 and release the converted light 26 gradually, for a period of several minutes or hours, once the excitation light 24 is no longer present.

The long persistence photoluminescent material 18, according to one embodiment, may be operable to emit light at or above an intensity of 0.32 mcd/m² after a period of 10 minutes. Additionally, the long persistence photoluminescent material 18 may be operable to emit light above or at an intensity of 0.32 mcd/m² after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from any light sources 44 that emits the excitation light 24, including, but not limited to, natural light sources (e.g., the sun) and/or any artificial light source 44. The periodic absorption of the excitation light 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source when the illumination intensity falls below 0.32 mcd/m², or any other predefined intensity level.

The long persistence photoluminescent material 18 may correspond to alkaline earth aluminates and silicates, for example doped di-silicates, or any other compound that is capable of emitting light for a period of time once the excitation light 24 is no longer present. The long persistence photoluminescent material 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of two to eight hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in Toluene/Isopropanol, 125 parts of a blue green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Figure 2:
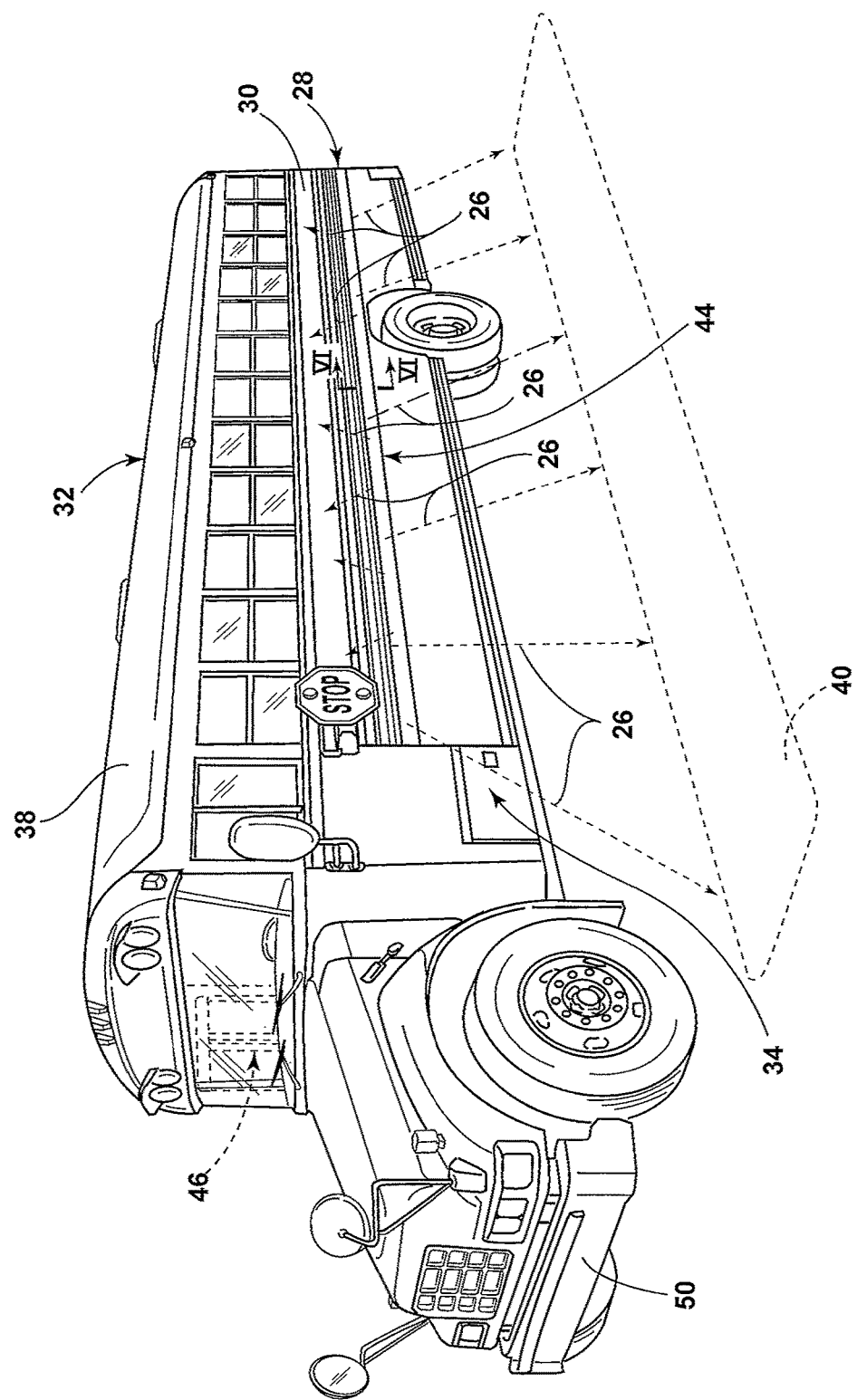
FIG. 2 is a side perspective view of a vehicle employing a lighting assembly on a side body panel according to one embodiment.

Referring to FIG. 2, a lighting assembly 28 is attached to an exterior of a body panel 30 of a vehicle 32 and is configured to illuminate an exterior portion 34 of the vehicle 32, according to one embodiment. As shown in FIG. 2, the lighting assembly 28 is arranged as an elongated strip extending longitudinally along the body panel 30. The elongated lighting assembly 28 may be formed from one or more portions.

The vehicle 32, in some embodiments, may be configured as a commercial or public vehicle 32, such as a school bus 38. The lighting assembly 28 may assist a vehicle operator, such as the school bus operator, in preventing accidents involving passengers boarding or exiting from the vehicle 32 or injuries to persons disposed around the vehicle that are not visible to the bus operator. For example, during times of poor visibility and/or when it is dark outside, such as at night, twilight, late winter afternoons, etc., passengers who are waiting to board the vehicle 32 may linger or fall near the vehicle 32 and accidentally end up near or underneath the vehicle 32, as it starts moving. The lighting assembly 28 shown in FIG. 2 aids the school bus operator in spotting persons or fallen objects underneath or near the vehicle 32. Accordingly, the lighting assemblies 28 may be focused downwardly to illuminate a portion of the ground 40 or the space just above the ground 40 along a side of the vehicle 32.

A light source 44 may be disposed on and/or within the lighting assembly 28 and oriented such that light may be emitted therefrom. The light source 44 may include any form of light source. For example, fluorescent lighting, light emitting diodes (LEDs), organic LEDs (OLEDs), polymer LEDs (PLEDs), solid-state lighting, or any other form of lighting configured to emit light may be utilized. According to one embodiment, one or more light sources 44 may be configured to emit a wavelength of excitation light 24 that is characterized as ultraviolet light (~10-400 nanometers in wavelength), violet light (~380-450 nanometers in wavelength), blue light (~450-495 nanometers in wavelength), and/or infrared light (IR) (~700 nm-1 mm in wavelength) to take advantage of the relative low cost attributable to those types of LEDs.

According to one embodiment, the lighting assembly(s) 28 may further include a photoluminescent structure 10 that may be configured to luminesce in response to excitation light 24 emitted from the light source 44. The luminescence exhibited by the lighting assembly 28 may provide one or more distinct lighting functions. For instance, the lighting assembly 28 may luminesce in a first color to indicate that it is safe to cross along the front side of the vehicle 32 and/or to leave the sidewalk. In another instance, the lighting assembly 28 may luminesce in a second color that is visually distinct from the first color to indicate that it is not safe to pass in front of the vehicle 32. Such illumination patterns, in addition to guiding bystanders such as the children and their guardians, may also serve to alert other drivers to the presence of children and to remind them of the requirement that they not enter the children's crossing area near the vehicle 32. The lighting assembly 28 may also be wired to automatically display messages or arrows (FIG. 4B) based on the opening or closing of a door 46, and/or any other vehicular condition.

Figure 3:
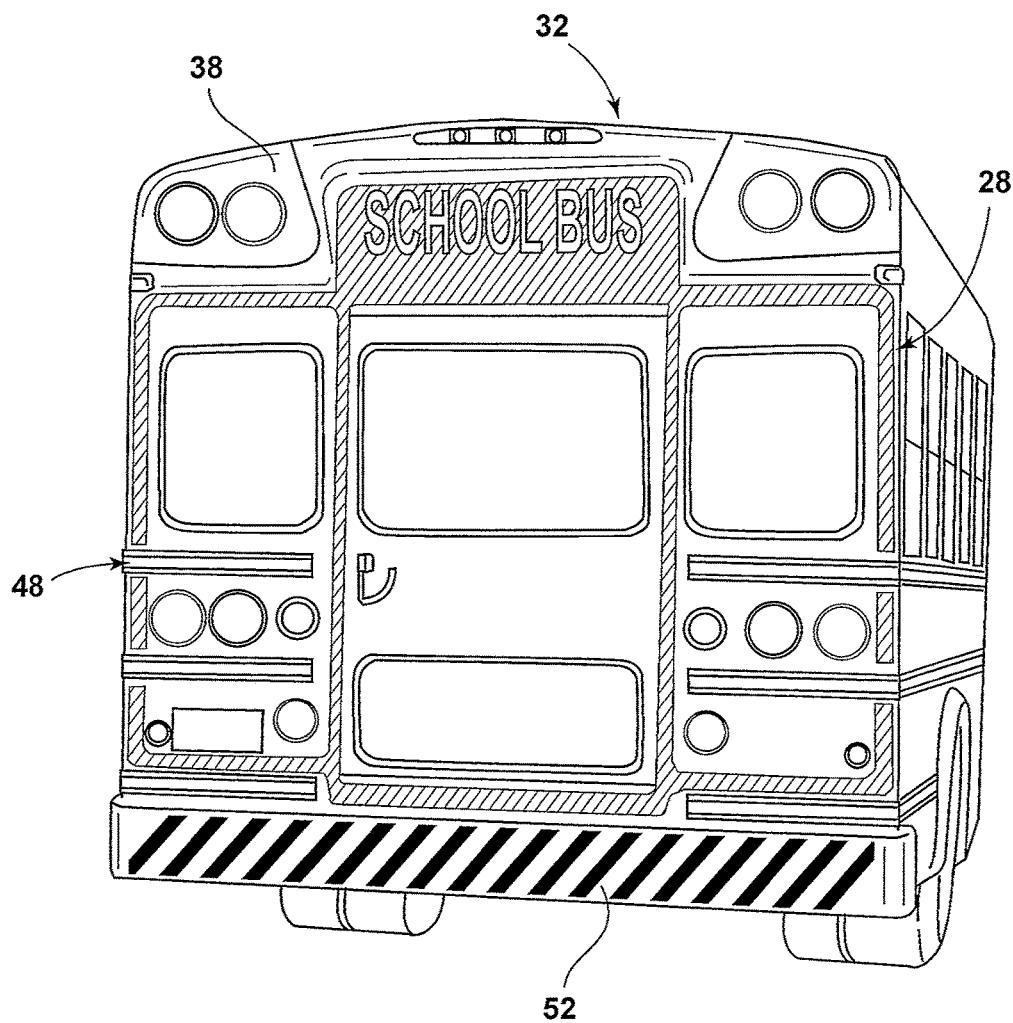
FIG. 3 is a rear perspective view of the vehicle employing lighting assemblies on a rear body panel, according to one embodiment.

Referring to FIG. 3, one or more lighting assemblies 28 may be provided on a rear portion 48 of the vehicle 32. The lighting assembly(s) 28 may have a linear and/or non-linear shape and may be configured to outline safety exits, or any other desired feature, of the vehicle 32. Moreover, the lighting assembly 28 may be permanently or removably disposed on locations that are easily viewable to other proximately located vehicles. For example, a lighting assembly 28 may be disposed on a front bumper 50 on the front side and/or a rear bumper 52 on the rear side of the vehicle 32, as will be described in greater detail below.

The lighting assemblies 28 may be oriented slightly downward to focus the light to where it is most needed and to reduce interference with the school bus operator's visibility. Thus, the lighting assembly 28 may be mounted at a slightly angled manner to focus light downward, or the individual light sources 44 within the lighting assembly 28 may be orientated to focus light downward or through the use of optics 116 (FIG. 6E).

Figure 4D:
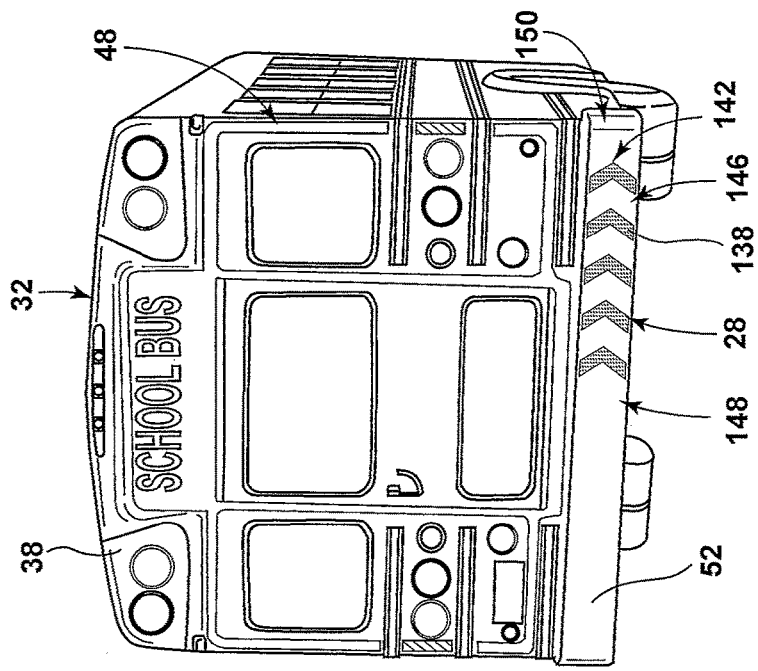
FIG. 4D is a rear perspective view of the vehicle having the lighting assembly disposed on the rear bumper having a second portion of one set of light sources illuminated, according to one embodiment.

Referring to FIGS. 4A-4F, the lighting assembly 28 may contain one or more sets 136, 138, 140 of light sources 44 that may be configured to illuminate in predefined patterns concurrently with one another. For example, as illustrated in FIG. 4B, the lighting assembly 28 contains a first set 136 of light sources 44 that may emit excitation light 24. A second set 138 of light sources 44 may be substantially aligned with the first set 136 of light sources 44. Similarly, a third set 140 of light sources 44 may also be aligned with the first and/or second sets 136, 138 of light sources 44, 70. Each set 136, 138, 140 of light sources 44 may have a similar shape to that of the other sets 136, 138, 140 of light sources 44, such as the chevron shape 142 illustrated in FIGS. 4B-4E. Alternatively, each set 136, 138, 140 of light sources 44 may include different shapes and/or symbols from one another within a single set 136, 138, 140 of light sources 44, or vary in shape from one set 136, 138, 140 of light sources 44 to another set 136, 138, 140 of light sources 44. By placing the light sources 44 in predefined sets 136, 138, 140, the lighting assembly 28 hardware costs, software, and/or design time may be reduced. It will be appreciated that the lighting assembly 28 may include any number (one or more) sets 136, 138, 140 of light sources 44 without departing from the teachings provided herein.

With further reference to FIG. 4A, an overmold material may conceal the lighting assembly 28 when each set 136, 138, 140 of light sources 44 is in the unilluminated state. Alternatively, the overmold material may include portions therein or thereon that convey messages when any and/or all of the sets 136, 138, 140 of light sources 44 are in the unilluminated state and/or the illuminated state.

With reference to FIG. 4B, the first set 136 of light sources 44 may illuminate in a first color (e.g., red), the second set 138 of light sources 44 may illuminate in a second color (e.g., yellow), and the third set 140 of light sources 44 may illuminate in a third color (e.g., green). However, it will be appreciated that any of the light sources 44 described herein may illuminate in any color without departing from the scope of the present disclosure.

The light sources 44, according to one embodiment, that form the first, second and third sets 136, 138, 140 of light sources 44 may be configured as Red, Green, and Blue (RGB) LEDs having separate red, green, and blue LED chips therein. Alternatively, the first, second and third sets 136, 138, 140 of light sources 44 may include some, or all, unicolored light sources 44. Further, each individual set 136, 138, 140 of light sources 44 may emit excitation light 24 at a different wavelength than any other set 136, 138, 140 of light sources 44, or any of the sets 136, 138, 140 of light sources 44 may emit a common wavelength of excitation light 24. One or more photoluminescent structures 10 may luminesce in response to the excitation light 24 to emit converted light 26 in one or more colors.

Figure 4C:
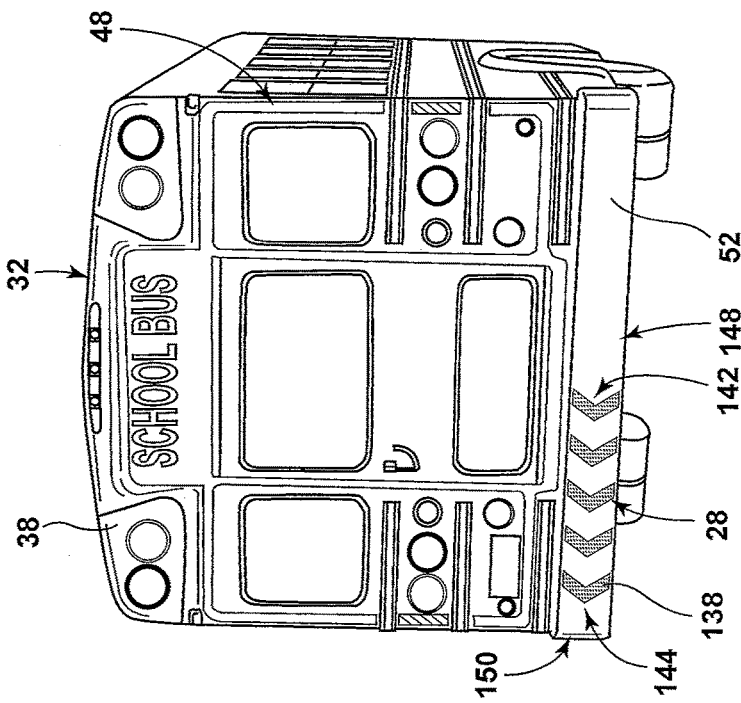
FIG. 4C is a rear perspective view of the vehicle having the lighting assembly disposed on the rear bumper having a first portion of one set of light sources illuminated, according to one embodiment.

With reference to FIGS. 4C and 4D, each set 136, 138, 140 of the light sources 44, which may be designed in the chevron shape 142, may have a first portion of symbols 144 that are orientated in a first direction and a second portion of symbols 146 that are orientated in a second direction. The respective set 136, 138, 140 of light sources 44 that correspond with the first and second portions of symbols 144, 146 may be illuminated by the light sources 44.

According to one embodiment, the second set 138 of light sources 44 may illuminate the first portion of symbols 144 and/or the second portion of symbols 146 in unison, or sequentially from a center location 148 towards a side 150, 152 of the rear bumper 52 to function as an auxiliary turn signal for the vehicle 32. The first set 136 and/or third set 140 of light sources 44 may illuminate in a similar manner to direct approaching vehicles 182 of a proper time to pass the vehicle 32 and a side of the vehicle 32 that passing may be performed safely.

With reference to FIG. 4E, one or more sets 136, 138, 140 of light sources 44 may illuminate when the bus 38 is picking up, or dropping off, passengers. According to one embodiment, the second set 138 of light sources 44 may flash between an illumined state and an unilluminated state as the vehicle 32 approaches a known pickup or drop-off location. The illumination sequence may be initiated by the vehicle 32 driver, or by a sensor, e.g., ultrasonic, imaging, radar, LIDAR, GPS, etc., on the vehicle 32. For example, a navigation system may be used in conjunction with the lighting assembly 28 such that the illumination sequence is automatically initiated when the vehicle 32 is within a predefined distance of a known pickup or drop-off location. The first set 136 of light sources 44 may then be initiated once the location is reached, when the vehicle 32 comes to a stop, and/or when the vehicle drops below a threshold speed, such as 10 miles per hour (mph).

With reference to FIG. 4F, multiple sets 136, 138, 140 of light sources 44 may be illuminated simultaneously to alert proximate vehicles 182 of any desired condition. For example, the first and second sets 136, 138 of light sources 44 may illuminate in conjunction with one another to function as primary, or auxiliary, emergency lights. Alternatively, multiple sets 136, 138, 140 of light sources 44 may be illuminated in conjunction with one another to alert nearby vehicles 182 that a recent occupant of the vehicle 32 will be, or is, crossing a roadway.

Figure 5C:
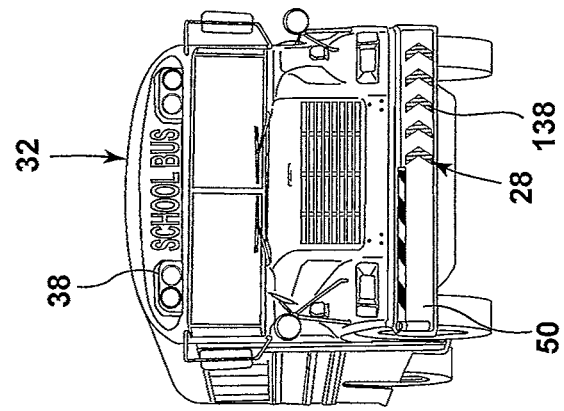
FIG. 5C is a front perspective view of the vehicle employing the lighting assembly on a front bumper of the vehicle and having one set of light sources illuminated, according to one embodiment.
Figure 5B:
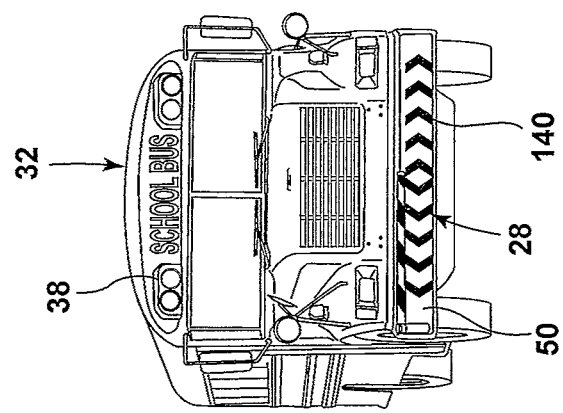
FIG. 5B is a front perspective view of the vehicle employing the lighting assembly on a front bumper of the vehicle and having a second portion of one set of light sources illuminated, according to one embodiment.
Figure 5A:
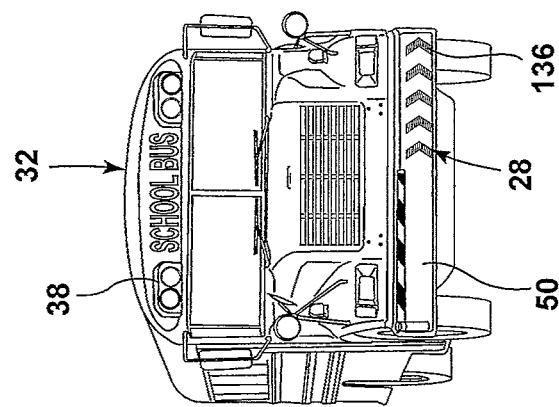
FIG. 5A is a front perspective view of the vehicle employing the lighting assembly on a front bumper of the vehicle and having a first portion of one set of light sources illuminated, according to one embodiment.

Referring to FIGS. 5A-5C, the lighting assembly 28 may also, or alternatively, be disposed on the front portion of the vehicle 32. As illustrated in FIGS. 5A-5C, the lighting assembly 28 is disposed on the front bumper 50 of the vehicle 32. However, it will be appreciated that the lighting assembly 28 may be disposed on any portion of the vehicle 32 without departing from the scope of the present disclosure.

With further reference to FIGS. 5A-5C, the lighting assembly 28 disposed on the front portion of the vehicle 32 may illuminate in any manner described herein in reference to any portion of the vehicle 32. For example, the front lighting assembly 28 may be used for alerting approaching vehicles 182 of the vehicle's 32 intent to turn, stop, load, unload, etc.

Figure 6A:
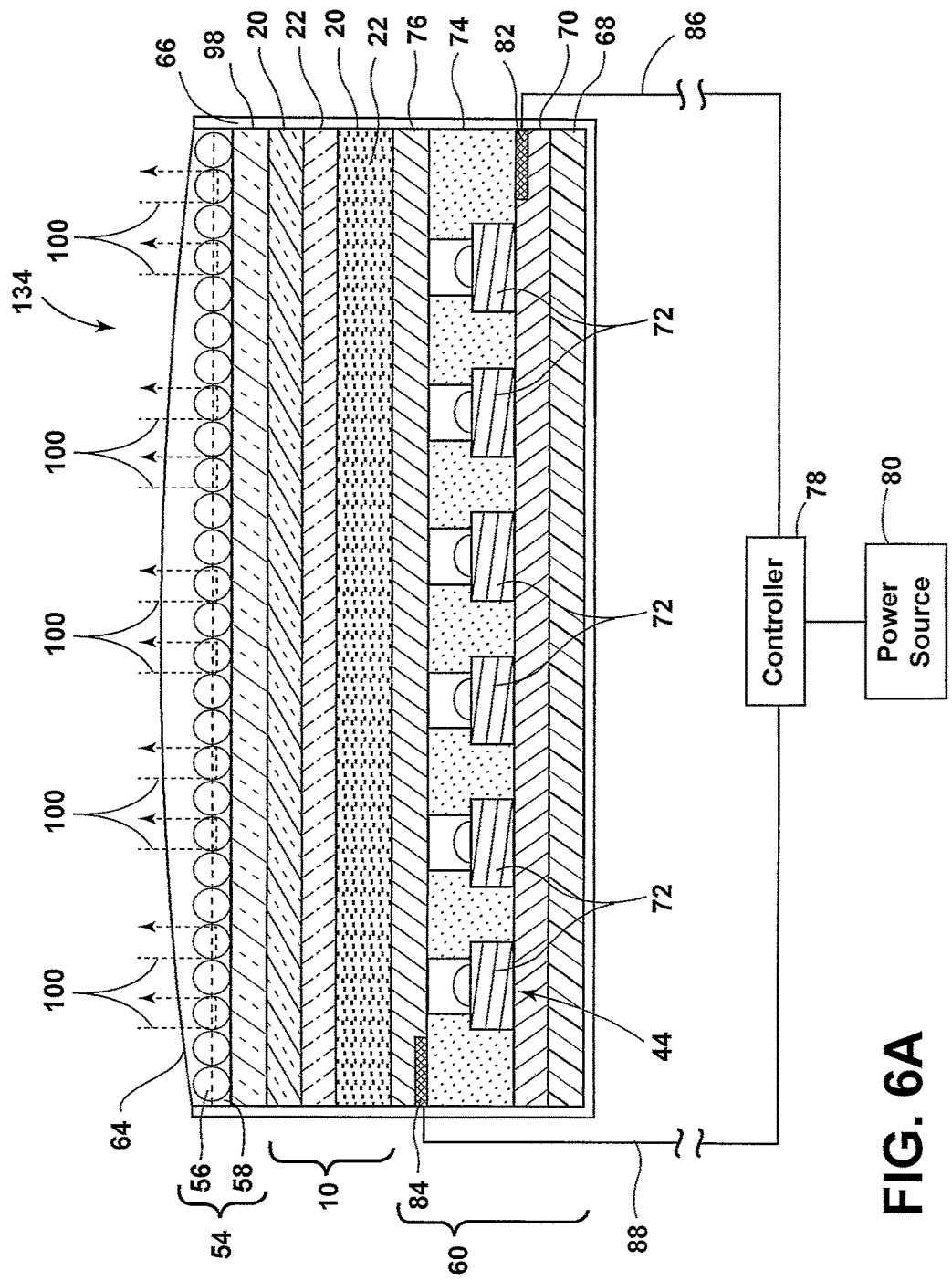
FIG. 6A is a cross-sectional view taken along line VI-VI of FIG. 1 illustrating a light source according to one embodiment.
Figure 6B:
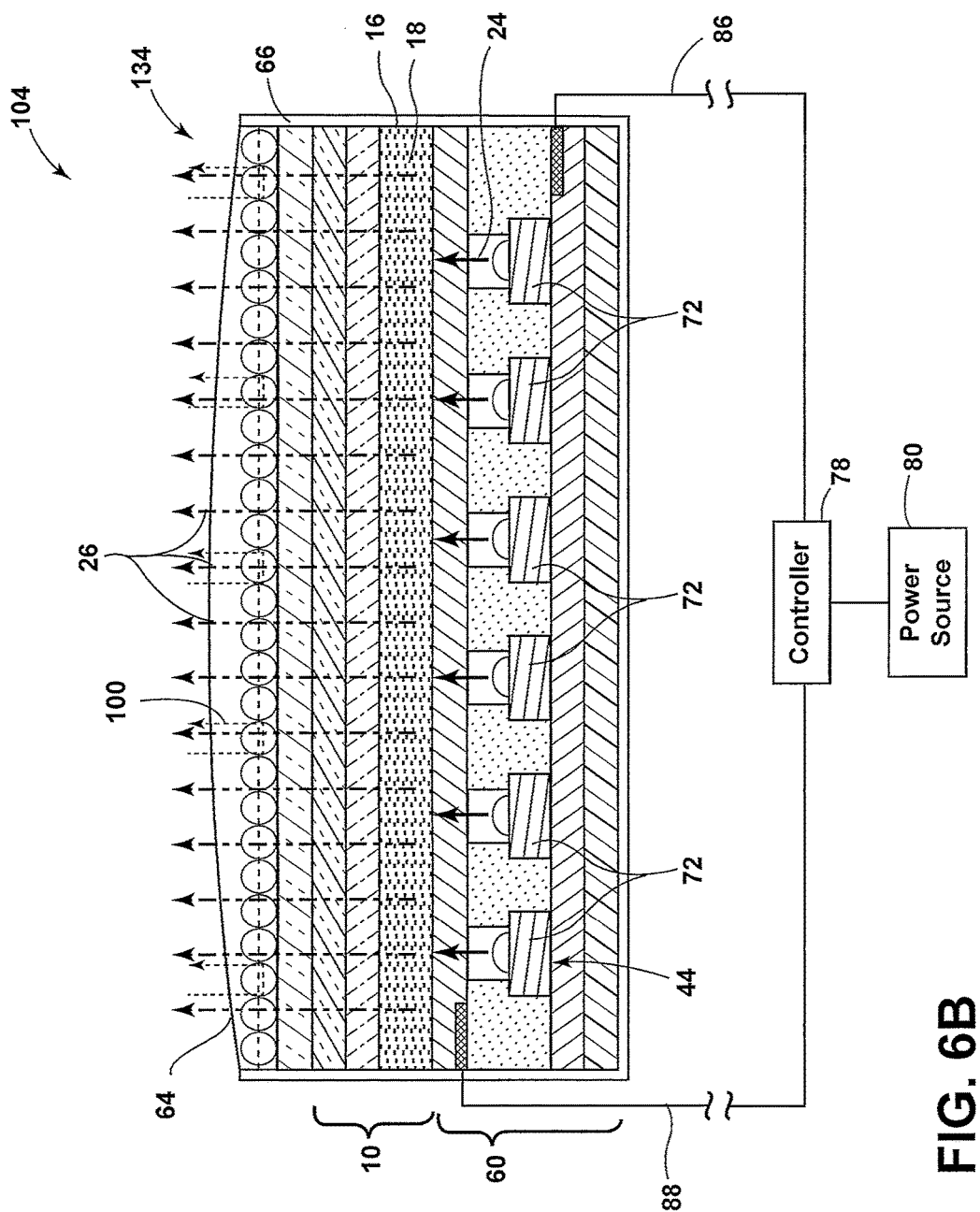
FIG. 6B is a cross-sectional view taken along line VI-VI of FIG. 1 further illustrating an the light source, according to one embodiment.
Figure 6C:
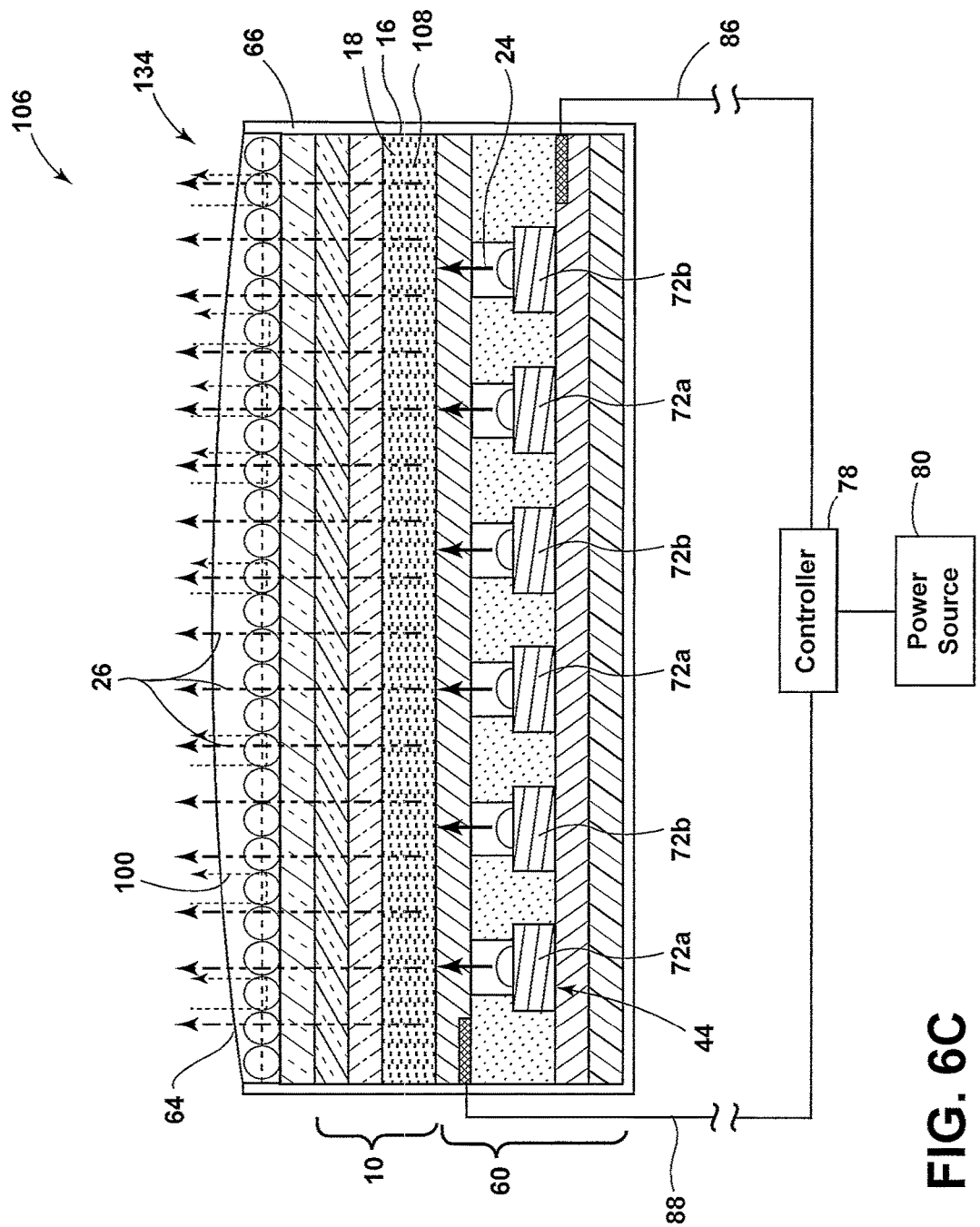
FIG. 6C is a cross-sectional view taken along line VI-VI of FIG. 1 illustrating an alternate light source, according to one embodiment.
Figure 6D:
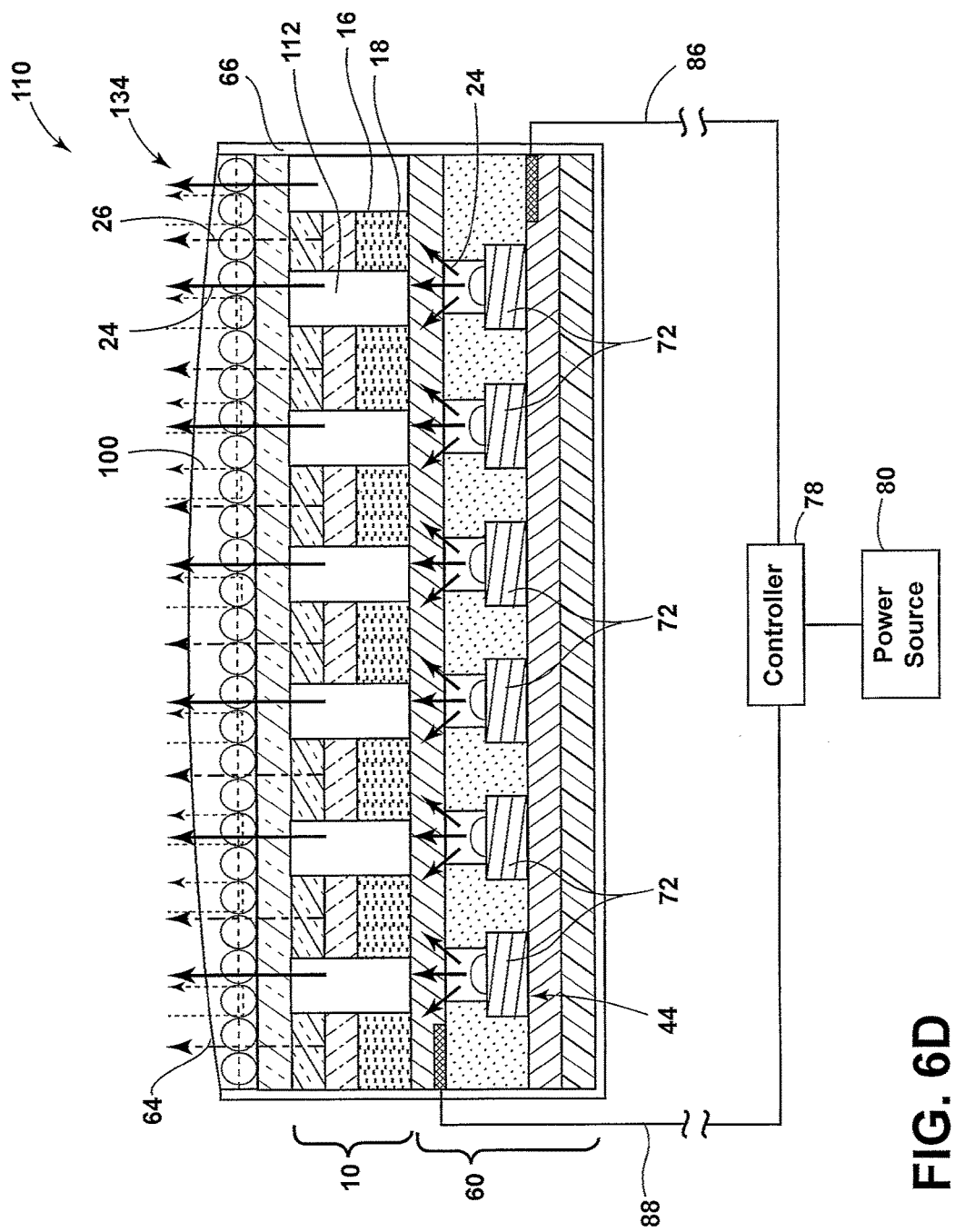
FIG. 6D is a cross-sectional view taken along line VI-VI of FIG. 1 illustrating a light source having a luminescent structure separated by light transmissive portions disposed on the light source, according to one embodiment.
Figure 6E:
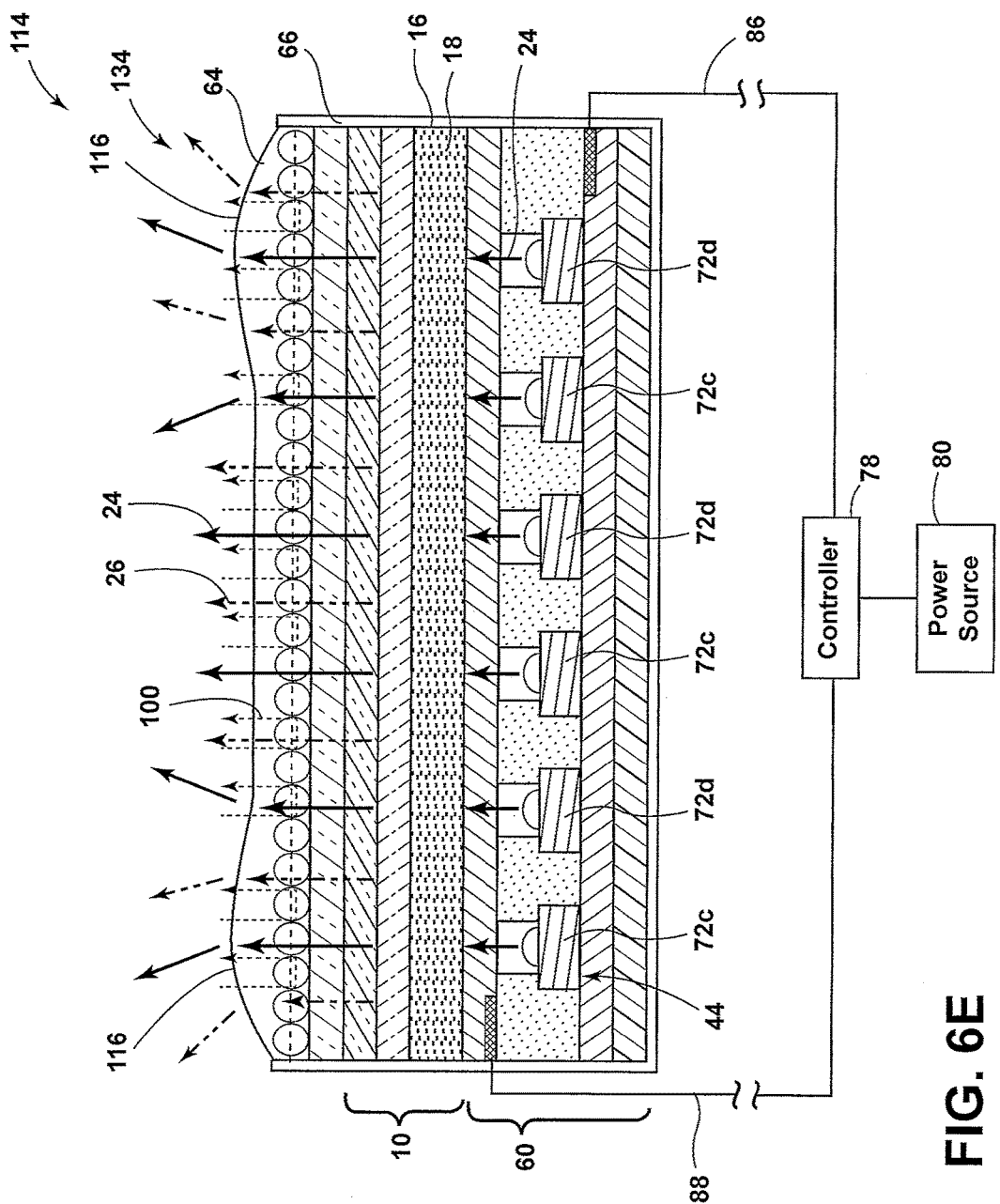
FIG. 6E is a cross-sectional view taken along line VI-VI of FIG. 1 illustrating an alternate light source having a luminescent structure disposed on the light source configured to convert a portion of light emitted from the light source from a first wavelength to a second wavelength, according to one embodiment.

Referring to FIGS. 6A-6E, a cross-sectional view of the light source 44 capable of use on a vehicle 32 with an external photoluminescent structure 10 is shown according to one embodiment taken along the line VI-VI of FIG. 1. As illustrated in FIG. 6A, the light source 44 may have a stacked arrangement that includes a light-producing assembly 60, a photoluminescent structure 10, a viewable portion 64, a reflective layer 54, and an overmold material 66. It should be appreciated that the viewable portion 64 and the overmold material 66 may be two separate components, or may be integrally formed as a single component.

The light-producing assembly 60 may correspond to a thin-film or printed light emitting diode (LED) assembly and includes a substrate 68 as its lowermost layer. The substrate 68 may include a polycarbonate, poly-methyl methacrylate (PMMA), or polyethylene terephthalate (PET) material on the order of 0.005 to 0.060 inches thick and is arranged over the intended vehicle substrate on which the light source 44 is to be received (e.g., the body panel 30). Alternatively, as a cost saving measure, the substrate 68 may directly correspond to a preexisting structure (e.g., a portion of the body panel 30, etc.).

The light-producing assembly 60 includes a positive electrode 70 arranged over the substrate 68. The positive electrode 70 includes a conductive epoxy such as, but not limited to, a silver-containing or copper-containing epoxy. The positive electrode 70 is electrically connected to at least a portion of a plurality of LED sources 72 arranged within a semiconductor ink 74 and applied over the positive electrode 70. Likewise, a negative electrode 76 is also electrically connected to at least a portion of the LED sources 72. The negative electrode 76 is arranged over the semiconductor ink 74 and includes a transparent or translucent conductive material such as, but not limited to, indium tin oxide. Additionally, each of the positive and negative electrodes 70, 76 are electrically connected to a controller 78 and a power source 80 via a corresponding bus bar 82, 84 and conductive leads 86, 88. The bus bars 82, 84 may be printed along opposite edges of the positive and negative electrodes 70, 76 and the points of connection between the bus bars 82, 84 and the conductive leads 86, 88 may be at opposite corners of each bus bar 82, 84 to promote uniform current distribution along the bus bars 82, 84. It should be appreciated that in alternate embodiments, the orientation of components within the light-producing assembly 60 may be altered without departing from the concepts of the present disclosure. For example, the negative electrode 76 may be disposed below the semiconductor ink 74 and the positive electrode 70 may be arranged over the aforementioned semiconductor ink 74. Likewise, additional components, such as the bus bars 82, 84 may also be placed in any orientation such that the light-producing assembly 60 may emit converted light 26 towards a desired location.

The LED sources 72 may be dispersed in a random or controlled fashion within the semiconductor ink 74 and may be configured to emit focused or non-focused light toward the photoluminescent structure 10. The LED sources 72 may correspond to micro-LEDs of gallium nitride elements on the order of about 5 to about 400 microns in size and the semiconductor ink 74 may include various binders and dielectric material including, but not limited to, one or more of gallium, indium, silicon carbide, phosphorous, and/or translucent polymeric binders.

The semiconductor ink 74 can be applied through various printing processes, including ink jet and silk screen processes to selected portion(s) of the positive electrode 70. More specifically, it is envisioned that the LED sources 72 are dispersed within the semiconductor ink 74, and shaped and sized such that a substantial quantity of the LED sources 72 (e.g., over 50%) align with the positive and negative electrodes 70, 76 during deposition of the semiconductor ink 74. The portion of the LED sources 72 that ultimately are electrically connected to the positive and negative electrodes 70, 76 may be illuminated by a combination of the bus bars 82, 84, controller 78, power source 80, and conductive leads 86, 88. According to one embodiment, the power source 80 may correspond to a vehicular power source 80 operating at 12 to 16 VDC. Additional information regarding the construction of light-producing assemblies 60 is disclosed in U.S. Pat. No. 9,299,887 to Lowenthal et al. entitled "ULTRA-THIN PRINTED LED LAYER REMOVED FROM SUBSTRATE," the entire disclosure of which is incorporated herein by reference.

Referring still to FIG. 6A, the photoluminescent structure 10 is arranged over the negative electrode 76 as a coating, layer, film or other suitable deposition. With respect to the presently illustrated embodiment, the photoluminescent structure 10 may be arranged as a multi-layered structure including an energy conversion layer 16, optional stability layer 20, and optional protective layer 22, as described above.

In some embodiments, a decorative layer 98 may be disposed between the viewable portion 64 and the photoluminescent structure 10. However, the decorative layer 98 may be disposed in any other location within the lighting assembly 28 in alternate embodiments. The decorative layer 98 may include a polymeric material or any other suitable material and is configured to control or modify an appearance of the viewable portion 64. For example, the decorative layer 98 may be configured to confer a metallic appearance to the viewable portion 64. The metallic appearance can be disposed rearwardly of the viewable portion 64 through any method known in the art, including, but not limited to, sputter deposition, vacuum deposition (vacuum evaporation coating), electroplating, or directly printing onto a component of the lighting assembly 28. The metallic appearance may be chosen from a wide range of reflective materials and/or colors, including, but not limited to, silver, chrome, copper, bronze, gold, or any other metallic surface. Additionally, an imitator of any metallic material may also be utilized without departing from the teachings provided herein.

In other embodiments, the decorative layer 98 may be tinted any color to complement the vehicle structure on which the lighting assembly 28 is to be received. In any event, the decorative layer 98 may be at least partially light transmissible such that the converted light 26 is not prevented from illuminating the viewable portion 64.

A reflective layer 54 may also be disposed above the photoluminescent structure 10. The reflective layer 54 may include clear, translucent, and/or opaque portions and may be colored any desired color. The reflective layer 54 may include any retroreflective material that generally functions to reflect incident light 100 that is directed from the environment proximate the lighting assembly 28 towards the viewable portion 64. According to one embodiment, the reflective layer 54 is configured as a plurality of retroreflective beads 56. The beads 56 may be formed from a glass material, a polymeric material, and/or any other practicable material. In some embodiments, a portion of the beads 56 may be a first material (e.g., a glass) and a second portion of the beads 56 may be a second material (e.g., a polymeric material). The beads 56 may have a solid construction, or may be hollow. In embodiments where the beads 56 have a hollow core, the internal void may include any type of material, solid, liquid, or gas, without departing from the teachings provided herein. It will be appreciated that in alternate embodiments, retroreflective materials other than beads may be utilized within the retroreflective layer without departing from the teachings provided herein.

According to one embodiment, the material within the beads 56 may have a different refractive index than the material of the beads 56. The beads 56 may have a substantially spherical shape, an oblong shape, an irregular shape, or combinations thereof. The beads 56 may range in size from about 60 μm (0.0024 inches) to about 850 μm (0.034 inches). The bead 56 size may be expressed in terms of U.S. Sieve Number, or the size of mesh screen that a bead 56 will pass through. For example, a U.S. Sieve Number 20 will permit beads with a diameter of 840 μm (0.033 inches) or less to pass through the mesh, whereas a Number 200 mesh will allow those beads 56 of 74 μm (0.0029 inches) or less to pass. According to one embodiment, the beads 56 may be chosen from 20 to 200 U.S. Sieve Number. The beads 56, according to one embodiment, are substantially mono dispersed in size and/or shape. According to an alternate embodiment, the beads 56 may be configured in a variety of sizes and/or shapes that are randomly distributed within a light transmissive adhesive layer 58.

According to one embodiment, the reflective layer 54 may contain over 10, 100 or 1000 beads 56 per square foot that are bonded to the light-producing assembly 60 within the transmissive adhesive layer 58. The beads 56 and/or adhesive layer 58 may be printed onto the light-producing assembly 60. Instead of scattering light, the retroreflective glass beads 56 may reflect incident light 100 (e.g., ambient light) and redirect the incident light 100 away from the light-producing assembly 60 thereby creating reflective characteristics. For the beads 56 to retroreflect light, the beads 56 may be partially transparent and substantially round. However, it will be understood that the beads may be translucent and/or any other shape without departing from the teachings provided herein.

The transparency of the glass beads 56 may allow incident light 100, or ambient light, to pass into and be subsequently redirected out of the beads 56. As the incident light 100 enters the beads 56, it may be bent (refracted) by the rounded surface of the beads 56 to a point below where the beads 56 are embedded in the adhesive layer 58. The incident light 100 striking the back of the beads 56 surface, which is embedded within the adhesive layer 58, may then be reflected outwardly in a substantially convergent direction to which the incident light 100 entered the beads 56, with only a small fraction of the light going back toward the photoluminescent structure 10 and/or the light-producing assembly 60. In some embodiments, the decorative layer and the adhesive layer 58 may be a single layer.

The glass beads 56 may be applied to the photoluminescent structure 10 and/or the light-producing assembly 60 in a premixed solution, disposed into the wet adhesive layer 58, dropped onto a premixed two-part epoxy or thermoplastic material, and/or through any other process known in the art. According to one embodiment, the glass beads 56 may be embedded to greater than about 10%, 20%, 30%, 40%, 50% or 60% of the diameter of the beads 56. In other words, a portion of the beads may protrude from the adhesive layer 58. It will be understood that multiple contiguous layers of beads 56 may be utilized within the paint such that some beads 56 are completely surrounded by the adhesive layer 58 while other beads 56 protrude. The depth of the beads 56 within the adhesive layer 58 may be consistent across the lighting assembly 28 or may vary across the lighting assembly 28 such that certain areas are highlighted. In some embodiments, it may be desired to provide a consistent quality of both beads 56 and adhesive layer thickness 58 to promote even retroreflectivity along the lighting assembly 28.

The retroreflected light from the glass beads 56 may be a function of three variables including the index of refraction of the glass beads 56; the bead 56 shape, size, and surface characteristics; and the number of beads 56 present and exposed to incident light 100. The bead's 56 Refractive Index (RI) is a function of the chemical makeup of the beads 56. The higher the RI, the more incident light 100 that is retroreflected. According to one embodiment, the beads 56 disposed on the light-producing assembly 60 have a refractive index in the range of 1 to 2.

The viewable portion 64 is arranged over the photoluminescent structure 10. In some embodiments, the viewable portion 64 may include a plastic, silicon, or urethane material and is molded over the reflective layer 54, the photoluminescent structure 10, and/or the light-producing assembly 60. Preferably, the viewable portion 64 should be at least partially light transmissible. In this manner, the viewable portion 64 will be illuminated by the photoluminescent structure 10 whenever an energy conversion process is underway. Additionally, by over-sealing the viewable portion 64, it may also function to protect the photoluminescent structure 10 and the light-producing assembly 60. The viewable portion 64 may be arranged in a planar shape and/or an arcuate shape to enhance its viewing potential. Like the photoluminescent structure 10 and the light-producing assembly 60, the viewable portion 64 may also benefit from a thin design, thereby helping to fit the light source 44 into small package spaces of the vehicle 32.

The overmold material 66 is disposed around the light-producing assembly 60, the photoluminescent structure 10, and/or the reflective layer 54. According to one embodiment, the overmold material 66 may be disposed around a top portion of the reflective beads 56 and form some, or all, of the viewable portion 64. The overmold material 66 may protect the light-producing assembly 60 from a physical and chemical damage arising from environmental exposure. The overmold material 66 may have viscoelasticity (i.e., having both viscosity and elasticity), a low Young's modulus, and/or a high failure strain compared with other materials so that the overmold material 66 may protect the light-producing assembly 60 when contact is made thereto. For example, the overmold material 66 may protect the light-producing assembly 60 from the environmental containments, such as dirt and water that may come in contact with the body of the vehicle 32. It is also contemplated that the viewable portion 64 may be formed by a portion of the overmold material 66.

In some embodiments, the photoluminescent structure 10 may be employed separate and away from the light-producing assembly 60. For example, the photoluminescent structure 10 may be positioned on a rim, a tire, a window, and/or any surface proximate, but not in physical contact with, the light-producing assembly 60. It should be understood that in embodiments where the photoluminescent structure 10 is incorporated into distinct components separated from the light source 44, the light source 44 might still have the same or similar structure to the light source 44 described in reference to FIG. 6A.

Referring to FIG. 6B, an energy conversion process 104 for producing single color luminescence is illustrated according to one embodiment. For purposes of illustration, the energy conversion process 104 is described below using the light source 44 depicted in FIG. 6A. In this embodiment, the energy conversion layer 16 of the photoluminescent structure 10 includes a single photoluminescent material 18, which is configured to convert excitation light 24 received from LED sources 72 into an converted light 26 having a wavelength different than that associated with the excitation light 24. More specifically, the photoluminescent material 18 is formulated to have an absorption spectrum that includes the emission wavelength of the excitation light 24 supplied from the LED sources 72. The photoluminescent material 18 is also formulated to have a Stokes shift resulting in the visible converted light 26 having an emission spectrum expressed in a desired color, which may vary per lighting application. The visible converted light 26 is outputted from the light source 44 via the viewable portion 64, thereby causing the viewable portion 64 to illuminate in the desired color. The illumination provided by the viewable portion 64 may offer a unique, substantially uniform, and/or attractive viewing experience that may be difficult to duplicate through non-photoluminescent means.

Referring to FIG. 6C, a second energy conversion process 106 for generating multiple colors of light is illustrated according to one embodiment. For consistency, the second energy conversion process 106 is also described below using the light source 44 depicted in FIG. 6A. In this embodiment, the energy conversion layer 16 includes the first and second photoluminescent materials 18, 108 that are interspersed within the energy conversion layer 16. Alternatively, the photoluminescent materials 18, 108 may be isolated from each other if desired. Also, it should be appreciated that the energy conversion layer 16 may include more than two different photoluminescent materials 18 and 108, in which case, the teachings provided below similarly apply. In one embodiment, the second energy conversion process 106 occurs by way of down conversion using blue, violet, and/or UV light as the source of excitation.

With respect to the presently illustrated embodiment, the excitation of photoluminescent materials 18, 108 is mutually exclusive. That is, photoluminescent materials 18, 108 are formulated to have non-overlapping absorption spectrums and Stoke shifts that yield different emission spectrums. Also, in formulating the photoluminescent materials 18, 108, care should be taken in choosing the associated Stoke shifts such that the converted light 26 emitted from one of the photoluminescent materials 18, 108, does not excite the other, unless so desired. According to one exemplary embodiment, a first portion of the LED sources 72, exemplarily shown as LED sources 72a, is configured to emit an excitation light 24 having an emission wavelength that only excites photoluminescent material 18 and results in the excitation light 24 being converted into a converted light 26 of a first color (e.g., white). Likewise, a second portion of the LED sources 72, exemplarily shown as LED sources 72b, is configured to emit an excitation light 24 having an emission wavelength that only excites second photoluminescent material 108 and results in the excitation light 24 being converted into a converted light 26 of a second color (e.g., red). Preferably, the first and second colors are visually distinguishable from one another. In this manner, LED sources 72a and 72b may be selectively activated using the controller 78 to cause the photoluminescent structure 10 to luminesce in a variety of colors. For example, the controller 78 may activate only LED sources 72a to exclusively excite photoluminescent material 18, resulting in the viewable portion 64 illuminating in the first color. Alternatively, the controller 78 may activate only LED sources 72b to exclusively excite the second photoluminescent material 108, resulting in the viewable portion 64 illuminating in the second color.

Alternatively still, the controller 78 may activate LED sources 72a and 72b in concert, which causes both of the photoluminescent materials 18, 108 to become excited, resulting in the viewable portion 64 illuminating in a third color, which is a color mixture of the first and second color (e.g., pinkish). The intensities of the excitation light 24 emitted from each light source 44 may also be proportionally varied to one another such that additional colors may be obtained. For energy conversion layers 16 containing more than two distinct photoluminescent materials 18, a greater diversity of colors may be achieved. Contemplated colors include red, green, blue, and combinations thereof, including white, all of which may be achieved by selecting the appropriate photoluminescent materials 18 and correctly manipulating the corresponding LED sources 72.

Referring to FIG. 6D, a third energy conversion process 110 includes a light-producing assembly 60, such as the one described in reference to FIG. 6A, and a photoluminescent material 108 disposed thereon is illustrated, according to an alternate embodiment. The photoluminescent material 108 is configured to convert excitation light 24 received from LED sources 72 into a converted light 26 having a wavelength different than that associated with the excitation light 24. More specifically, the photoluminescent structure 10 is formulated to have an absorption spectrum that includes the emission wavelength of the excitation light 24 supplied from the LED sources 72. The photoluminescent material 18 is also formulated to have a Stokes shift resulting in the converted light 26 having an emission spectrum expressed in a desired color, which may vary per lighting application.

The photoluminescent structure 10 may be applied to a portion of the light-producing assembly 60, for example, in a stripped manner. Between the photoluminescent structures 10 may be light transmissive portions 112 that allow excitation light 24 emitted from the LED sources 72 to pass therethrough at the first wavelength. The light transmissive portions 112 may be an open space, or may be a transparent or translucent material. The excitation light 24 emitted through the light transmissive portions 112 may be directed from the light-producing assembly 60 towards a second photoluminescent structure 162 (FIG. 8) disposed proximate to the light-producing assembly 60. The second photoluminescent structure 162 may be configured to luminesce in response to the excitation light 24 that are directed through the light transmissive portions 112.

Referring to FIG. 6E, a fourth energy conversion process 114 for generating multiple colors of light utilizing the light-producing assembly 60, such as the one described in reference to FIG. 6A, and a photoluminescent structure 10 disposed thereon is illustrated. In this embodiment, the photoluminescent structure 10 is disposed over a top portion of the light-producing assembly 60. The excitation of photoluminescent material 18 is formulated such that a portion of excitation light 24 emitted from the LED sources 72 passes through the photoluminescent structure 10 at the first wavelength (i.e., the excitation light 24 emitted from the light source 44 is not converted by the photoluminescent structure 10). The intensity of the outputted light (i.e., the combination of the excitation light 24 and converted light 26) may be modified by pulse-width modulation or current control to vary the amount of excitation light 24 emitted from the LED sources 72 that passes through the photoluminescent structure 10 without converting to a second wavelength of converted light 26. For example, if the light source 44 is configured to emit excitation light 24 at a low level, substantially all of the excitation light 24 may be converted to converted light 26. In this configuration, a color of converted light 26 corresponding to the photoluminescent structure 10 may be emitted from the light-producing assembly 60. If the light source 44 is configured to emit excitation light 24 at a high level, only a portion of the first wavelength may be converted by the photoluminescent structure 10. In this configuration, a first portion of the outputted light may be converted by the photoluminescent structure 10 and a second portion of the outputted light may be emitted from the light-producing assembly 60 at the first wavelength towards additional photoluminescent structures 162, 164 (FIG. 8) disposed proximately to the light source 44. The additional photoluminescent structures 162, 164 may luminesce in response to the excitation light 24 emitted from the light source 44.

According to one exemplary embodiment, a first portion of the LED sources 72, exemplarily shown as LED sources 72a is configured to emit an excitation light 24 having a wavelength that excites the photoluminescent material 18 within the photoluminescent structure 10 and results in the excitation light 24 being converted into a converted light 26 of a first color (e.g., white). Likewise, a second portion of the LED sources 72, exemplarily shown as LED sources 72c, is configured to emit an excitation light 24 having a wavelength that passes through the photoluminescent structure 10 and excites additional photoluminescent structures 162, 164 disposed proximately to the lighting assembly 28 thereby illuminating in a second color. The first and second colors may be visually distinguishable from one another. In this manner, LED sources 72a and 72c may be selectively activated using the controller 78 to cause the lighting assembly 28 to luminesce in a variety of colors.

The light-producing assembly 60 may also include optics 116 that are configured to direct excitation light 24 emitted from the LED sources 72a, 72c and the converted light 26 emitted from the photoluminescent structure 10 towards pre-defined locations. For example, excitation light 24 emitted from the LED sources 72a, 72c and the photoluminescent structure 10 may be directed and/or focused towards the ground 40 and/or a location proximate to the lighting assembly 28.

Figure 7:
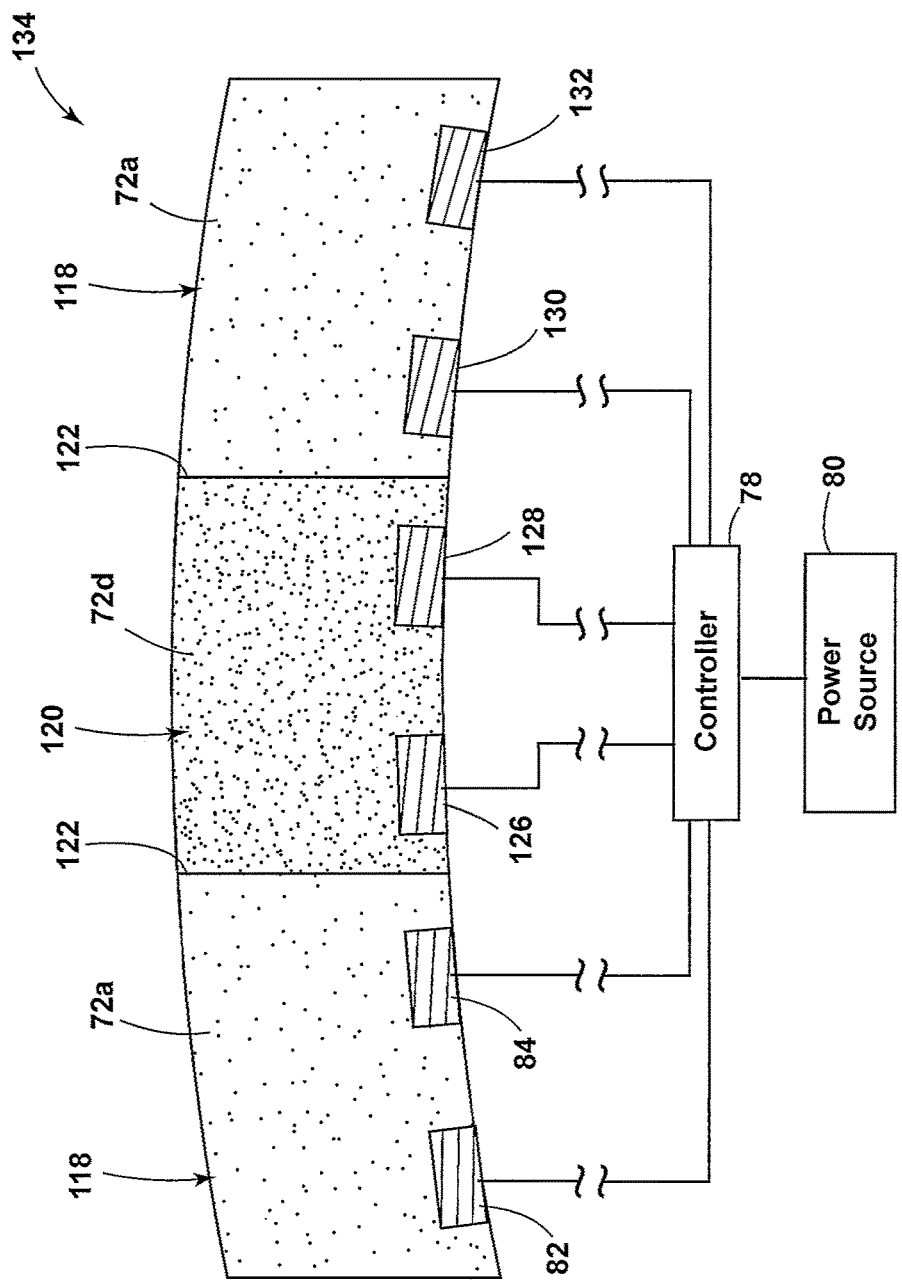
FIG. 7 illustrates a top view of a light-producing assembly, according to one embodiment, having varying types and concentrations of LED sources transversely along the light-producing assembly.

Referring to FIG. 7, a light-producing assembly 60, according to one embodiment, is illustrated from a top view having varying types and concentrations of LED sources 72a, 72d transversely along the light-producing assembly 60. As illustrated, a first portion 118 of the light-producing assembly 60 includes LED sources 72a that are configured to emit an excitation light 24 having an emission wavelength in a first color (e.g., red) spectrum. Likewise, a second portion 120 of the light-producing assembly 60 includes LED sources 72d that are configured to emit an excitation light 24 having an emission wavelength in a second color (e.g., yellow) spectrum. The first and second portions 118, 120 of the light-producing assembly 60 may be separated by insulative, or non-conductive, barriers 122 from proximately disposed portions through any means known in the art such that each portion 118, 120 may be illuminated independently of any other portion 118, 120. The insulative barriers 122 may also prevent a substantial amount of excitation light 24 emitted from proximately illuminated LED sources 72a, 72d from crossing through the insulative barrier 122. Further, each portion 118, 120 disposed within the light-producing assembly 60 may include a respective bus bar 82, 84, 126, 128, 130, 132 coupled to the controller 78 and configured to illuminate each respective portion 118, 120.

According to one embodiment, the first and second colors are visually distinguishable from one another. In this manner, LED sources 72a and 72d may be selectively activated using the controller 78 to cause the LED sources 72a, 72d to illuminate in a variety of colors. For example, the controller 78 may activate only LED sources 72a to exclusively illuminate a portion 118 of the light-producing assembly 60 in the first color. Alternatively, the controller 78 may activate only LED sources 72d to exclusively illuminate a portion 120 of the light-producing assembly 60 in the second color. It should be appreciated that the light-producing assembly 60 may include any number of portions 118, 120 having varying LED sources 72a, 72d that may illuminate in any desired color. Moreover, it should also be appreciated that the portions having varying LED sources 72a, 72d may be orientated in any practicable manner and need not be disposed adjacently.

As described above, a photoluminescent structure 10 may be disposed on a portion of the light-producing assembly 60. If desired, any of the LED sources 72a, 72d may be utilized for exciting any photoluminescent material 18 disposed proximately to and/or above the light-producing assembly 60.

The semiconductor ink 74 may also contain various concentrations of LED sources 72a, 72d such that the concentration of the LED sources 72a, 72d, or number of LED sources 72a, 72d per unit area, may be adjusted for various lighting applications. In some embodiments, the concentration of LED sources 72a, 72d may vary across the length of the light-producing assembly 60. For example, a first portion 118 of the light-producing assembly 60 may have a greater concentration of LED sources 72 than alternate portions 120, or vice versa. In such embodiments, the light source 44 and/or the indicia may appear brighter or have a greater luminance in order to preferentially illuminate pre-defined locations. In other embodiments, the concentration of LED sources 72a, 72d may increase or decrease with increasing distance from a preselected point.

According to one embodiment, the light-producing assembly 60 includes a higher concentration of LED sources 72a in the second portion 120 such that the second portion 120 may illuminate as a side marker, or turn indicator, while the first portion 118 provides incident lighting.

Figure 8:
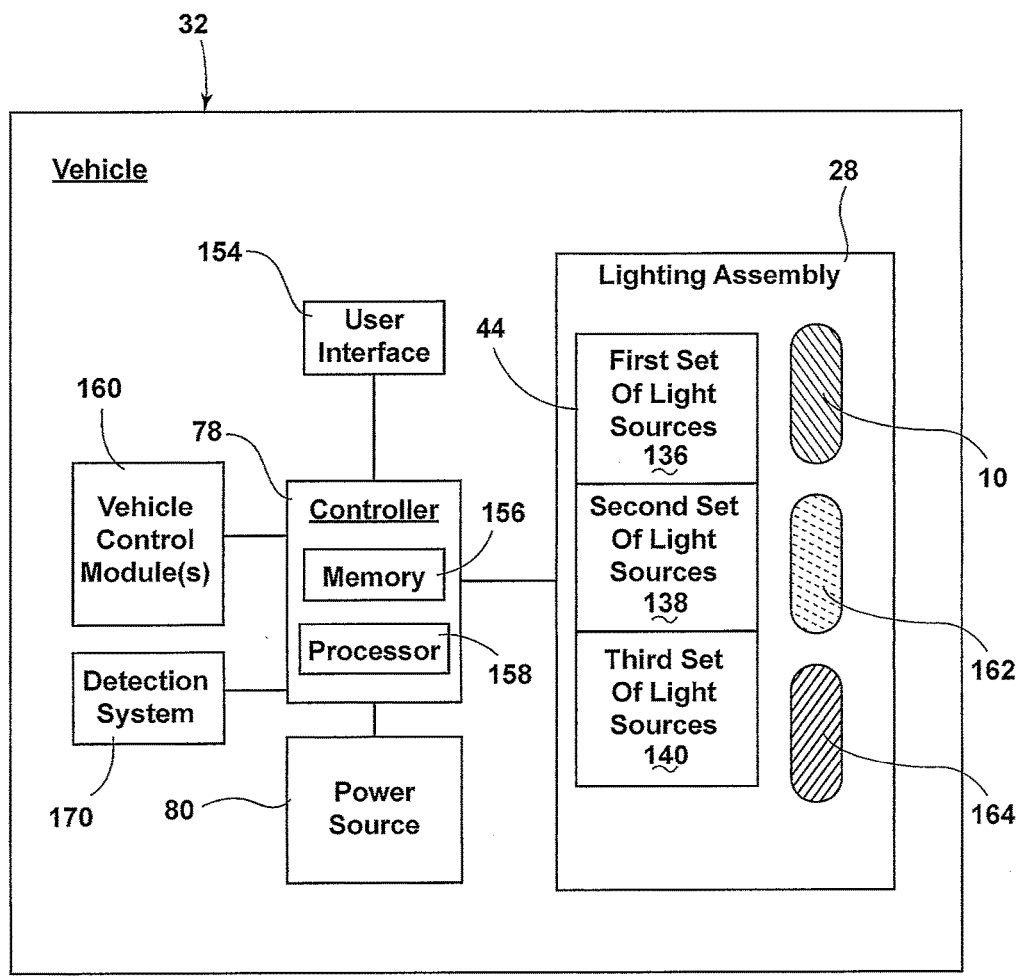
FIG. 8 is a block diagram of the vehicle equipped with the lighting assembly and illustrating the lighting control.

Referring to FIG. 8, a box diagram of a vehicle 32 is shown in which an illuminated lighting assembly 28 is implemented. The lighting assembly 28 includes the controller 78 in communication with the first, second, and third sets 136, 138, 140 of light sources 44. The controller 78 may include memory 156 having instructions contained therein that are executed by a processor 158 of the controller 78. The controller 78 may provide electrical power to the light sources 44 via the power source 80 located onboard the vehicle 32. In addition, the controller 78 may be configured to control the light output of each set 136, 138, 140 of light sources 44 based on feedback received from one or more vehicle control modules 160 such as, but not limited to, a body control module, engine control module, steering control module, brake control module, the like, or a combination thereof. As will be described in greater detail below, a detection system 170 having one or more sensors may also communicate with the controller 78 such that the light sources 44 may be activated based on inputted information from the detection system 170.

By controlling the light output of the first, second, and third sets 136, 138, 140 of light sources 44, the lighting assembly 28 may illuminate in a variety of colors and/or patterns to provide an aesthetic appearance, such as a marquee or any other dynamic illumination pattern, or may provide vehicle information to an intended observer.

In operation, the lighting assembly 28 may exhibit a constant unicolor or multicolor illumination. For example, the controller 78 may prompt one of the first, second, and third sets 136, 138, 140 of light sources 44 within the lighting assembly 28 to flash a multitude of colors at a pre-defined interval. Simultaneously, the remaining sets 136, 138, 140 of light sources 44 may illuminate in a steady unicolor, may flash through a multitude of colors, may excite the first, second, and/or third photoluminescent structures 10, 162, 164, and/or be placed in an off state by the controller 78. In one embodiment, the controller 78 may illuminate each set 136, 138, 140 of light sources 44 in any color at offset time intervals such that one set of light sources 44 (e.g., the second set 138 of light sources 44) illuminates as another set of light sources 44 returns to an unilluminated state (e.g., the first set 136 of light sources 44). For example, each first, second, and third set 140 of light sources 44 may illuminate for $1/100$ of a second to 1 second. Also, the controller 78 may vary power to each light source 44 from 1 to 5 times steady state current to vary the color and brightness of each illumination. The controller 78 may also illuminate multiple colors within a single light source 44 concurrently, thereby producing additional color configurations if the single light source 44 is configured as a RGB LED.

In another embodiment, the photoluminescent structures 10, 162, 164 may exhibit periodic unicolor or multicolor illumination. For example, the controller 78 may prompt the first set 136 of light sources 44 to periodically emit excitation light 24 to cause the first photoluminescent structure 10 to periodically illuminate in the first color. Alternatively, the controller 78 may prompt the second set 138 of light sources 44 to periodically emit excitation light 24 to cause the second photoluminescent structure 162 to periodically illuminate. Similarly, the controller 78 may prompt the third set 140 of light sources 44 to periodically emit excitation light 24 to cause the third photoluminescent structure 164 to periodically illuminate. Alternatively, the controller 78 may control the first, second, and third set 136, 138, 140 of light sources 44 to simultaneously and periodically emit the excitation light 24 to cause the first, second, and third photoluminescent structures 10, 162, 164 to periodically illuminate simultaneously.

The controller 78 may control the first, second, and third sets 136, 138, 140 of light sources 44 to periodically emit the excitation light 24 at a regular time interval and/or an irregular time interval. Thus, the lighting assembly 28 may appear in any color based on a combination of photoluminescent structures 10, 162, 164 while simultaneously having set points flicker in multiple different colors to create a unique appearance within the lighting assembly 28.

In another embodiment, the lighting assembly 28 may include a user interface 154. The user interface 154 may be configured such that a user may control the wavelength of excitation light 24 that is emitted by the light source 44 or the pattern of illumination of displayed on the viewable portion 64.

With respect to the above examples, the controller 78 may modify the intensity of the emitted excitation light 24 by pulse-width modulation or current control. Moreover, the controller 78 may vary power to each light source 44 from 1 to 5 times steady state current to vary the color and brightness of each illumination. The controller 78 may also illuminate multiple colors within a single multicolored light source 44 concurrently, thereby producing additional color configurations.

In some embodiments, the controller 78 may be configured to adjust a color of the converted light 26 by sending control signals to adjust an intensity or energy output level of the light source 44. For example, if the first, second, and third sets 136, 138, 140 of light sources 44 are configured to emit the excitation light 24 at a low level, substantially all of the excitation light 24 may be converted to the converted light 26 by the first, second, and/or third photoluminescent structures 10, 162, 164. In this configuration, a color of light corresponding to the converted light 26 may correspond to the color of the converted light 26 from the lighting assembly 28. If the first, second, and third sets 136, 138, 140 of light sources 44 are configured to emit the excitation light 24 at a high level, only a portion of the excitation light 24 may be converted to the converted light 26 by the first, second, and/or third photoluminescent structures 10, 162, 164. In this configuration, a color of light corresponding to mixture of the excitation light 24 and the converted light 26 may be output as the converted light 26. In this way, the controller 78 may control an output color of the converted light 26.

Though a low level and a high level of intensity are discussed in reference to the excitation light 24, it shall be understood that the intensity of the excitation light 24 may be varied among a variety of intensity levels to adjust a hue of the color corresponding to the converted light 26 from the lighting assembly 28. The variance in intensity may be manually altered, or automatically varied by the controller 78 based on pre-defined conditions. According to one embodiment, a first intensity may be output from the lighting assembly 28 when a light sensor senses daylight conditions. A second intensity may be output from the lighting assembly 28 when the light sensor determines the vehicle 32 is operating in a low light environment.

As described herein, the color of the converted light 26 may be significantly dependent on the particular photoluminescent materials 18 utilized in the first, second, and third photoluminescent structures 10, 162, 164. Additionally, a conversion capacity of the first, second, and third photoluminescent structures 10, 162, 164 may be significantly dependent on a concentration of the photoluminescent material 18 utilized in the first, second, and third photoluminescent structures 10, 162, 164. By adjusting the range of intensities that may be output from the first, second, and/or third set 136, 138, 140 of light sources 44, the concentration, types, and proportions of the photoluminescent materials 18 in the photoluminescent structures 10, 162, 164 discussed herein may be operable to generate a range of color hues of the converted light 26 by blending the excitation light 24 with the converted light 26. Moreover, the first, second, and third photoluminescent structures 10, 162, 164 may include a wide range of photoluminescent materials 18 that are configured to emit the converted light 26 for varying lengths of time.

Figure 9:
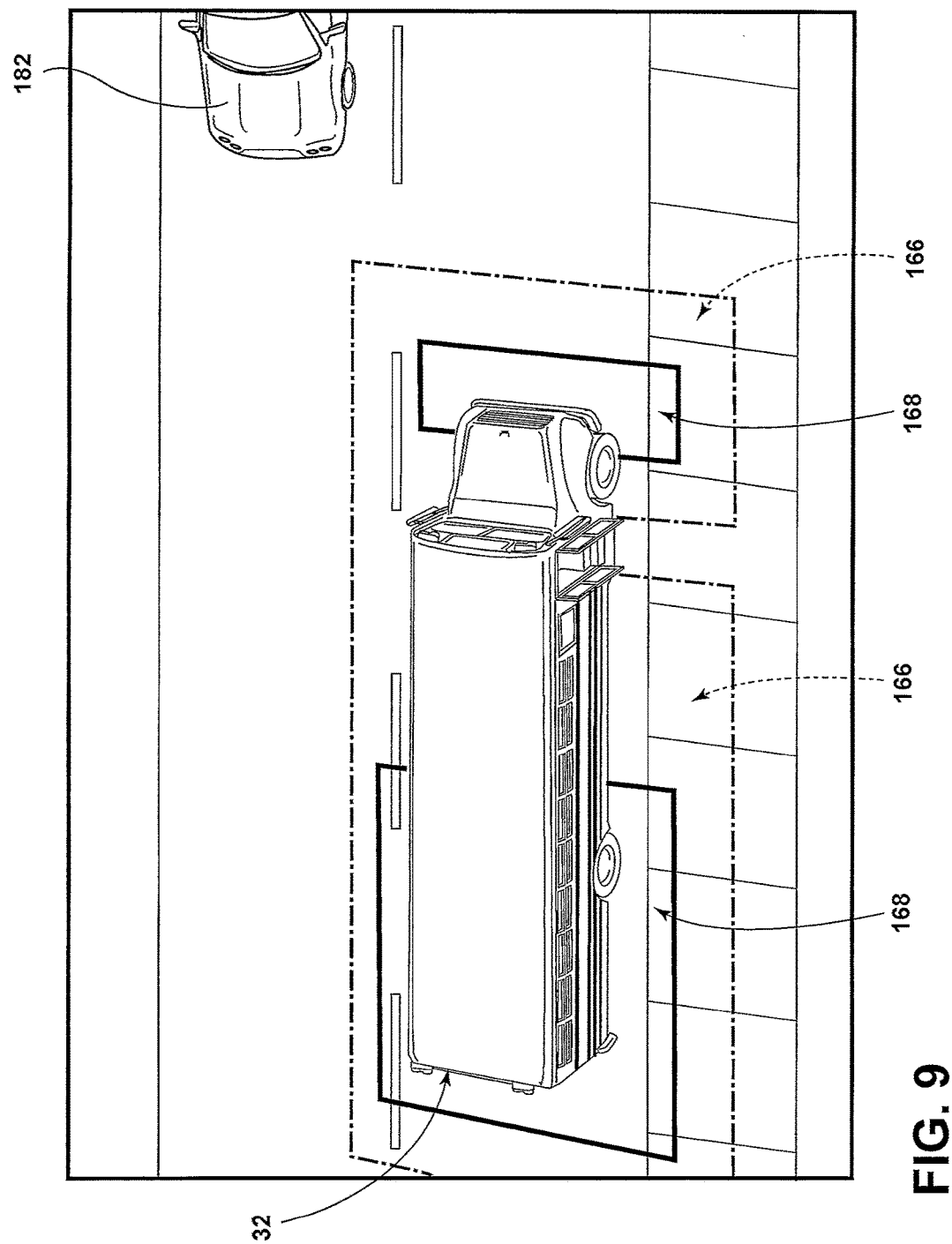
FIG. 9 is a top perspective view of the vehicle and a safety zone disposed around portions of the vehicle.

Referring to FIG. 9, a first zone 166 surrounds the periphery of the vehicle 32 and extends a predefined distance therefrom. For example, the first zone 166 may extend up to ten feet from the vehicle 32. A second, smaller zone 168 is disposed within the first zone 166 and may coincide with blind spots, or an area where a person's view is obstructed, around the vehicle 32.

With reference to FIGS. 10-13B, the vehicle 32 may include a detection system 170 that may provide audible alerts and/or communicate with the lighting assembly 28 to illuminate an exterior portion 34 of the vehicle 32 to warn both the driver of the vehicle 32 and surrounding persons, objects, and/or approaching vehicles 182. For example, the lighting system may illuminate when surrounding persons, objects, and/or approaching vehicles 182 are disposed within the first and/or second zones 166, 168. According to one embodiment, the detection system 170 includes the controller 78 and a plurality of sensors. The sensors may include one or more short-range sensors 172, one or more long-range sensors 174, and/or one or more cameras 176.

Figure 10:
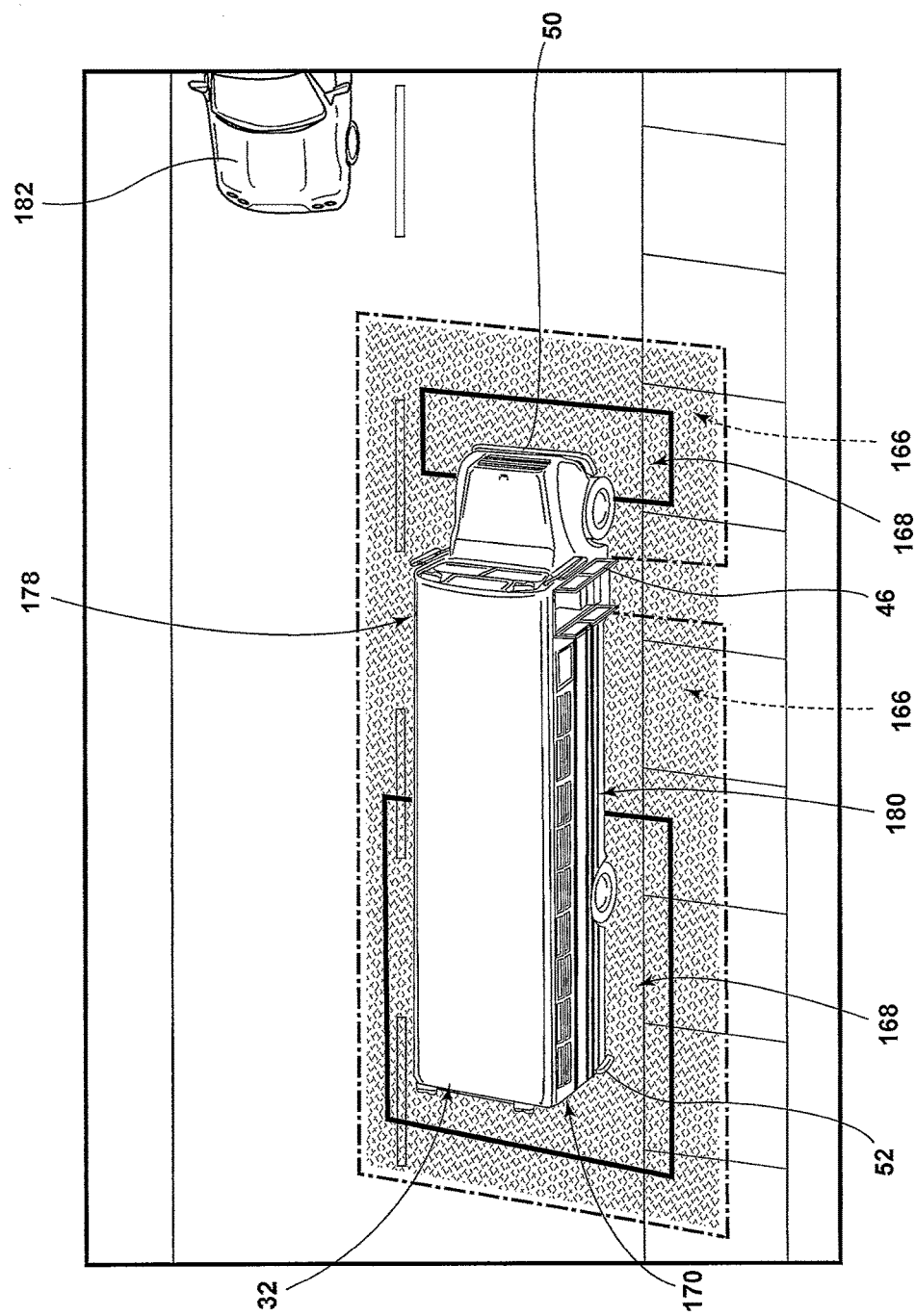
FIG. 10 is a top perspective view of the vehicle having one or more short-range sensors to detect objects and/or persons disposed proximately to the vehicle.

With reference to FIG. 10, the vehicle 32 includes the short-range sensors 172 disposed around a periphery of the vehicle 32. It will be appreciated, however, that any number of short-range sensors 172 may be provided based on factors such as, for example, the width of the vehicle 32 and/or the length of the vehicle 32. The short-range sensors 172 may be any suitable type of sensors, such as piezo-electric ultrasonic sensors. According to one embodiment, the short-range sensors 172 may have a field of view range of about 10 feet.

According to one embodiment, the short-range sensors 172 are disposed along the face of the front side bumper 50 and the rear side bumper 52. The short-range sensors 172 may also be disposed along a driver side 178, an opposing side 180, with may correspond with the door 46. Each short-range sensor 172 may independently communicate with the controller 78 and detect when an object is within the sensor's field of view. Accordingly, a substantial portion (e.g., at least 50%) of the first zone 166 may be covered by the overlapping field of views of the short-range sensors 172.

Figure 11:
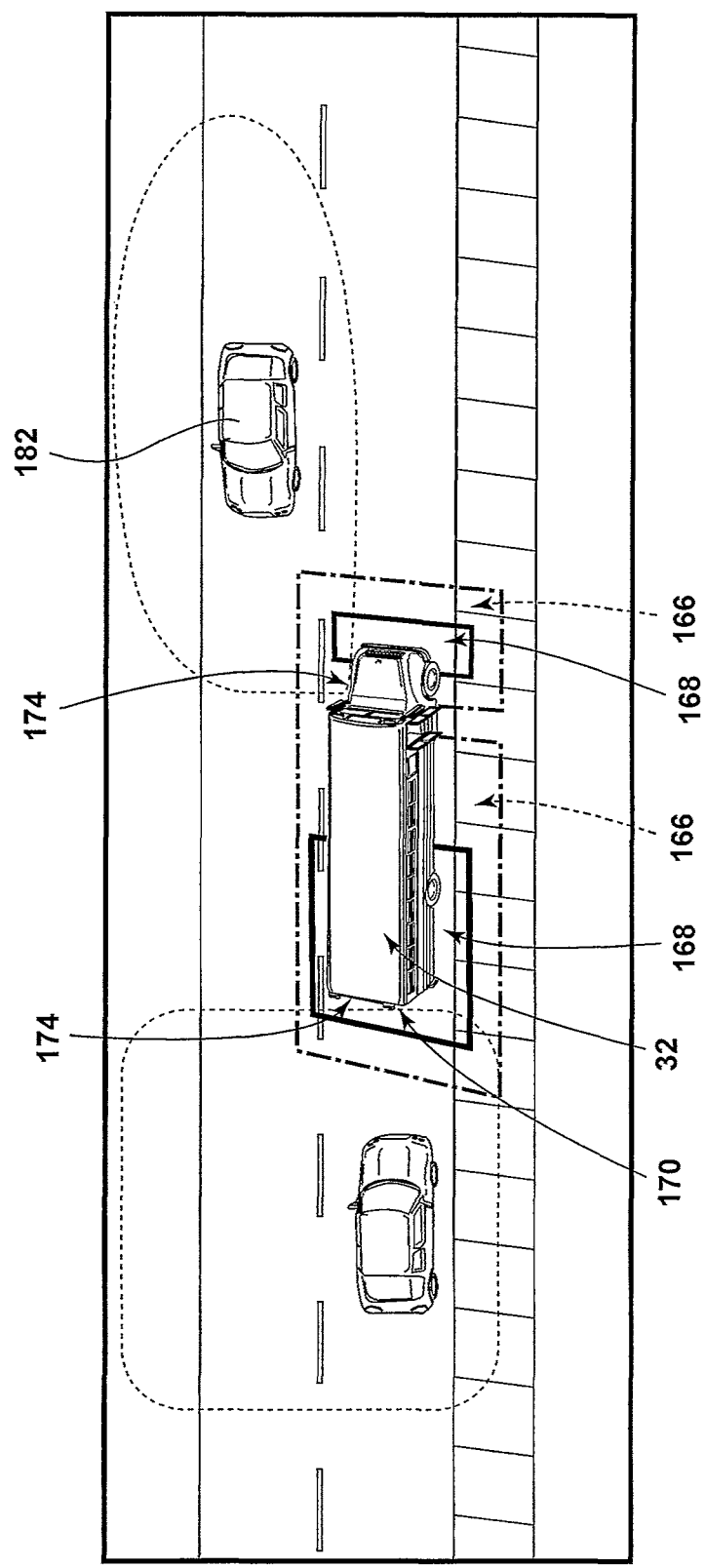
FIG. 11 is a top perspective view of the vehicle having the detection system that includes one or more long-range sensors to detect objects approaching the vehicle.

As illustrated in FIG. 11, the vehicle 32 may include one or more long-range sensors 174. The long-range sensors 174 may be a radar sensor, a Lidar sensor, or any other suitable distance measuring sensor that is suitable to detect approaching vehicles 182 and other objects in front of, behind, or otherwise proximate to the vehicle 32. According to one embodiment, the long-range sensor 174 has a range of about 600 feet forwardly and rearwardly of the vehicle 32 and 150 feet wide of the vehicle 32.

Figure 12:
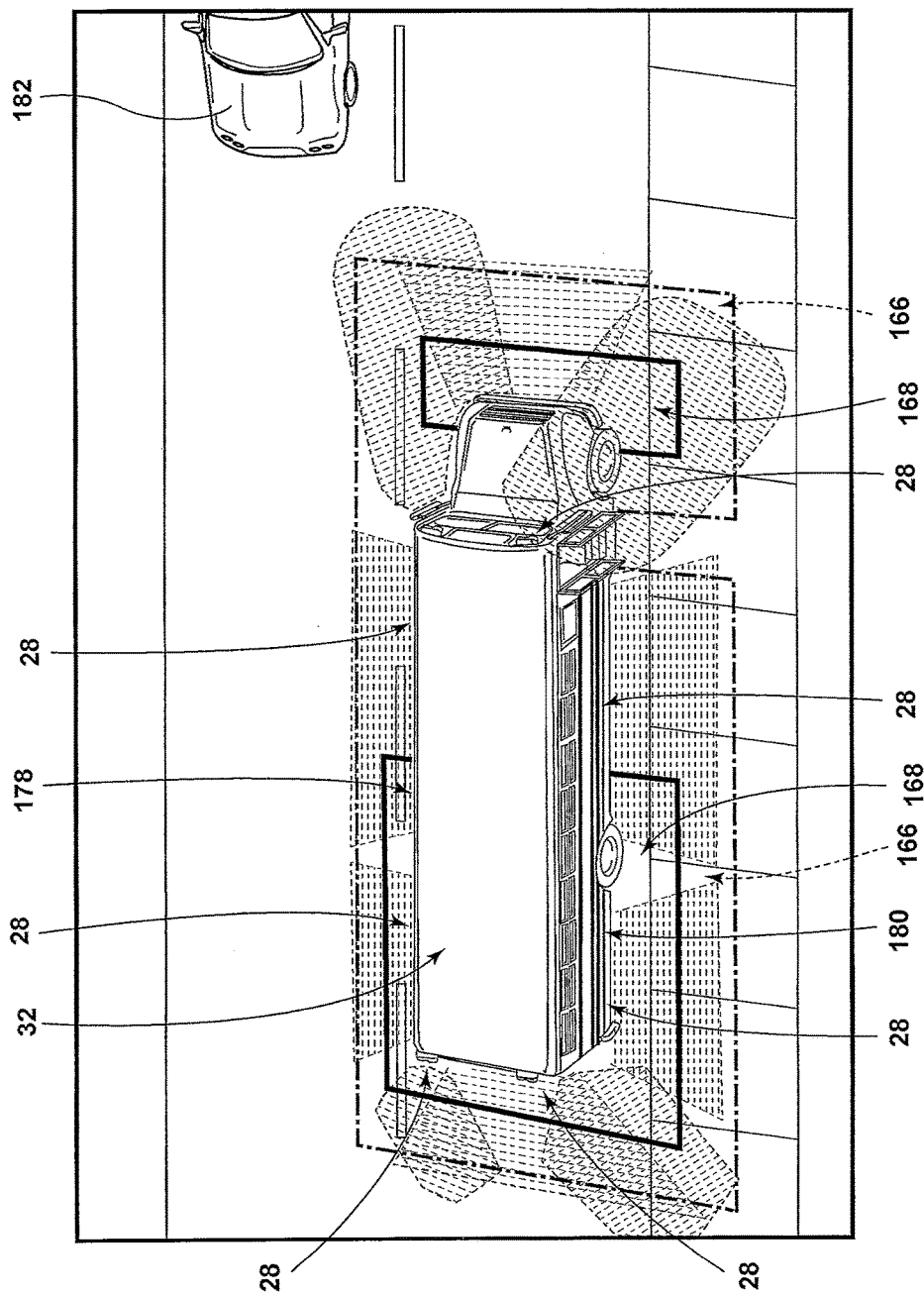
FIG. 12 is a top perspective view of the vehicle having a plurality of lighting assemblies there around that are used in conjunction with the detection system, according to one embodiment.

With reference to FIG. 12, according to one embodiment, the long-range sensor 174 and/or the short-range sensors 172 work in conjunction with the lighting system described herein. For example, the long-range sensors 174 may locate an approaching vehicle 182 and the lighting system may correspondingly illuminate a predefined sequence based on the current environment. According to one embodiment, when the vehicle 32 is loading and/or unloading, the lighting system may flash in a first color and/or at a first intensity. If the detection system 170 determines that an approaching vehicle 182 is not slowing or coming to a stop, a second color and/or a higher intensity of converted light 26 may be emitted from the lighting system to alert the driver of the approaching vehicle 182.

Referring still to FIG. 12, the lighting assembly 28 may illuminate whenever the vehicle 32 engine is running and the detection system 170 detects an object within the first and/or second zones 166, 168. According to one embodiment, the lighting assembly 28 may illuminate in a first color when the detection system 170 detects an object and/or person and a second color when the detection system 170 detects an object, person, and/or an approaching vehicle 182 to alert the driver of the detected object and/or person. The lighting assembly 28 and the detection system 170 may be initiated by the vehicle driver, or automatically initiated when the vehicle 32 is running and predefined events occur.

To provide sufficient lighting of the first and second zones 166, 168, the lighting assembly 28 may include a plurality of light-producing assemblies disposed along the front side, the rear side, the lateral sides, and/or at one or more corners of the vehicle 32. Each light-producing assembly may be independently illuminable and may include any number of sets 136, 138, 140 of light sources 44 therein.

Referring to FIGS. 13A and 13B, the camera 20 disposed on, or within, the vehicle 32 may be any suitable type of camera, such as a monocular camera. The camera 20 may be a multi-functional camera employing image processing techniques to analyze a scene of the road around the vehicle 32 in order to detect persons, lane markings, and/or other objects such as cars, trucks, buses 38, motorcycles, and bicycles. The camera 20 may include a lens, an imager, such as a high dynamic range RCCC (Rate-Constrained Coder Control) imager, a power supply, an oscillator and an LVDS (Low-voltage differential signal) transmitter that communicates with a video interface 184.

The video interface 184 may be disposed within the vehicle 32 and include one or more images 186, 188, 190, 192 that correspond with one or more cameras 176*a*, 176*b*, 176*c*, 176*d* disposed around the vehicle 32. According to one embodiment, the vehicle 32 includes a front-facing 176*a* and a rear-facing camera 176*b*. Additionally, or alternatively, the vehicle 32 may include one or more side facing cameras 176*c*, 176*d*. The side facing cameras 176*c*, 176*d* may include wide-angle lenses to correspond with the length of some vehicles 32.

The lighting assembly 28 may illuminate in conjunction with the camera 176 to provide a higher quality image of the area surrounding the vehicle 32. Moreover, the short-range sensor 172 and the long-range sensor 174 may be utilized in conjunction with the camera(s) 176*a*, 176*b*, 176*c*, 176*d* and the lighting assembly 28. For example, when any of the sensors detect an object, the camera 176*a*, 176*b*, 176*c*, 176*d* corresponding to a similar location may be highlighted on the video interface 184.

With further reference to FIGS. 13A-13B, the one or more cameras 176*a*, 176*b*, 176*c*, 176*d* may also record any instance in which an approaching vehicle 182 performs an unsafe maneuver, such as failing to stop as passengers are loaded and/or unloaded from the vehicle 32. A time stamp may be added to the saved images 186, 188, 190, 192 to provide additional information about the unsafe driving maneuver.

According to one embodiment, the detection system 170 may automatically control the lighting assembly 28 such that the light sources 44 within the lighting system continue to illuminate until all objects are removed from the field of view of the detection system 170. Thus, the driver, and approaching vehicles 182 will be alerted that it is safe to proceed when the first and/or second zones 166, 168 are free from objects.

Accordingly, a lighting assembly for a vehicle has been advantageously described herein. The lighting assembly provides various benefits including an efficient and cost-effective means to produce illumination that may function as a distinct styling element that increases the refinement of a vehicle, or any other product that may have an illumination assembly disposed thereon. The lighting system may also be utilized in conjunction with a detection system to provide additional safety benefits.

It is also important to note that the construction and arrangement of the elements of the disclosure as shown in the exemplary embodiments are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle, comprising:
    a lighting assembly including first and second sets of light sources disposed on a bumper of the vehicle, the first or second set of light sources configured to excite a photoluminescent structure disposed on the lighting assembly;
    a detection system configured to detect an object proximate the vehicle; and
    a controller that selectively activates the first set and second set of light sources in various geometric patterns upon detection of the object.

2. The vehicle of claim 1, wherein the detection system includes a plurality of cameras configured to monitor one or more blind spots disposed around the vehicle.

3. The vehicle of claim 1, wherein the first set of light sources emit a first excitation light of a first wavelength and the second set of light sources emit a second excitation light of a second wavelength.

4. The vehicle of claim 1, wherein the first and second sets of light sources include LED sources dispersed in a printed LED arrangement.

5. The vehicle of claim 1, wherein the photoluminescent structure includes at least one photoluminescent material therein configured to convert an excitation light received from at least one of the first and second sets of light sources into a visible converted light.

6. The vehicle of claim 1, wherein the lighting assembly illuminates a corresponding area proximate to the vehicle when the detection system detects an object proximately disposed to the vehicle and a vehicle transmission is in gear.

7. The vehicle of claim 3, wherein the lighting assembly illuminates in a first color when the vehicle is above a threshold speed and a second color when the vehicle slows to below the threshold speed.

8. A lighting assembly, comprising:
    a light-producing assembly on a vehicle bumper having a first, a second, and a third set of light sources therein; and
    a photoluminescent structure disposed on the light-producing assembly and configured to luminesce in response to excitation by the first, the second, and the third set of light sources of the light-producing assembly, wherein each respective set of light sources independently illuminates based on a pre-defined sensor event, wherein the first, the second, and the third set of light sources each independently illuminate in pre-defined geometric shapes to alert an approaching vehicle of a vehicle state.

9. The lighting assembly for a vehicle panel of claim 8, further comprising a controller for selectively activating one or more light sources disposed within the light-producing assembly.

10. The lighting assembly for a vehicle panel of claim 8, wherein the light-producing assembly includes LED sources dispersed in a printed LED arrangement.

11. The lighting assembly for a vehicle panel of claim 10, further comprising:
    a detection system disposed on a vehicle, wherein the first set of light sources is illuminated when the detection system fails to detect an object within a sensor's field of view and the second set of light sources is illuminated when an object is detected within the sensor's field of view.

12. The lighting assembly for a vehicle panel of claim 8, wherein the photoluminescent structure includes at least one photoluminescent material configured to perform an energy conversion on an excitation light received from at least a portion of the light-producing assembly into a visible, converted light.

13. A vehicle lighting assembly, comprising:
    first and second light sources disposed on a bumper and configured to excite a photoluminescent structure disposed thereon;
    a detection system including a sensor configured to detect an object proximate to a vehicle; and
    a controller operably coupled with the first and second light sources and the detection system, the controller configured to illuminate the first and second light sources in various geometric patterns upon detection of the object.

14. The vehicle lighting assembly of claim 13, wherein the first and second light sources include LED sources dispersed in a printed LED arrangement that are each configured to emit an excitation light.

15. The vehicle lighting assembly of claim 13, wherein the sensor is a short-range sensor.

16. The vehicle lighting assembly of claim 13, wherein the detection system includes a front long-range sensor, a rear long-range sensor, and a plurality of short range sensors disposed around an exterior portion of the vehicle.

17. The vehicle lighting assembly of claim 13, wherein the sensor is a long-range sensor.

18. The vehicle lighting assembly of claim 13, wherein the detection system further includes a camera operably coupled with the controller.

19. The vehicle lighting assembly of claim 18, further comprising:
    a video interface within the vehicle that is configured to show images from the camera, wherein the interface highlights an image if the sensor detects an object within a field of view of the camera.

* * * * *